US008390553B2

(12) United States Patent
Chang et al.

(10) Patent No.: US 8,390,553 B2
(45) Date of Patent: Mar. 5, 2013

(54) ADVANCED PIXEL DESIGN FOR OPTIMIZED DRIVING

(75) Inventors: Shih Chang Chang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 995 days.

(21) Appl. No.: 12/371,316

(22) Filed: Feb. 13, 2009

(65) Prior Publication Data

US 2010/0207861 A1 Aug. 19, 2010

(51) Int. Cl.
*G09G 3/36* (2006.01)
*G09G 5/00* (2006.01)
*G09G 5/02* (2006.01)
*G06F 3/038* (2006.01)

(52) U.S. Cl. ........... 345/90; 345/205; 345/690; 345/694

(58) Field of Classification Search ........................ None
See application file for complete search history.

(56) References Cited

U.S. PATENT DOCUMENTS 4,991,115 A 2/1991 Guthrie et al.
5,396,351 A 3/1995 Gessel
5,450,222 A 9/1995 Sirkin
5,659,378 A 8/1997 Gessel
6,157,426 A 12/2000 Gu
6,285,431 B2 9/2001 Lyu
6,433,933 B1 8/2002 Gettemy
6,466,285 B1 10/2002 Ichikawa
6,466,290 B2 10/2002 Kim
6,536,933 B1 3/2003 Gettemy et al.
6,545,862 B1 4/2003 Gettemy et al.
6,603,469 B1 8/2003 Gettemy et al.
6,618,044 B1 9/2003 Gettemy et al.
6,642,985 B2 11/2003 Kim
6,685,328 B1 2/2004 Hanson et al.
6,700,560 B2 3/2004 Sumiya
6,710,754 B2 3/2004 Oliver et al.
6,718,115 B1 4/2004 Gettemy et al.
6,741,314 B2 5/2004 Song
6,859,244 B2 2/2005 Kawase et al.

(Continued)

FOREIGN PATENT DOCUMENTS

JP 2001092382 4/2001
KR 2004061426 7/2004

(Continued)

OTHER PUBLICATIONS

U.S. Appl. No. 12/371,284, filed Feb. 13, 2009, Chang et al.

(Continued)

*Primary Examiner* — Daniell L Negron
(74) *Attorney, Agent, or Firm* — Fletcher Yoder PC

(57) ABSTRACT

Systems, devices, and methods for reducing common voltage loading and/or enabling a simplified manner of polarity inversion in liquid crystal display (LCD) devices are provided. In accordance with one embodiment, a device may include a processor, a memory device, and a liquid crystal display having a pixel array including rows and columns of pixels. The pixels of each row of the pixel array may be configured to cause an approximately even amount of common voltage loading to be shared between one of a first plurality of common electrodes and one of a second plurality of common electrodes when the pixels of each row of the pixel array receive a scanning signal and a data signal.

25 Claims, 15 Drawing Sheets

U.S. PATENT DOCUMENTS

| | | | |
|---|---|---|---|
| 6,888,532 | B2 | 5/2005 | Wong et al. |
| 6,919,681 | B2 | 7/2005 | Cok |
| 6,924,752 | B2 | 8/2005 | Gettemy et al. |
| 6,924,863 | B2 | 8/2005 | Nishida |
| 6,947,017 | B1 | 9/2005 | Gettemy |
| 6,965,375 | B1 | 11/2005 | Gettemy et al. |
| 6,992,659 | B2 | 1/2006 | Gettemy |
| 7,002,569 | B1 | 2/2006 | Gettemy et al. |
| 7,006,080 | B2 | 2/2006 | Gettemy |
| 7,034,802 | B1 | 4/2006 | Gettemy et al. |
| 7,048,401 | B2 | 5/2006 | Lee et al. |
| 7,057,579 | B2 | 6/2006 | Hanson et al. |
| 7,057,698 | B2 | 6/2006 | Chung |
| 7,068,256 | B1 | 6/2006 | Gettemy et al. |
| 7,079,119 | B2 | 7/2006 | Hanson et al. |
| 7,091,964 | B2 | 8/2006 | Wong et al. |
| 7,095,387 | B2 | 8/2006 | Lee et al. |
| 7,159,194 | B2 | 1/2007 | Wong et al. |
| 7,167,309 | B2 | 1/2007 | Saxena |
| 7,199,808 | B2 * | 4/2007 | Yo ................................ 345/694 |
| 7,203,075 | B2 | 4/2007 | Terada et al. |
| 7,248,271 | B2 | 7/2007 | Credelle |
| 7,248,320 | B2 | 7/2007 | Hirakata |
| 7,256,767 | B2 | 8/2007 | Wong et al. |
| 7,268,775 | B1 | 9/2007 | Gettemy |
| 7,304,707 | B2 | 12/2007 | Son |
| 7,324,093 | B1 | 1/2008 | Gettemy et al. |
| 7,339,639 | B2 | 3/2008 | Nakano et al. |
| 7,342,571 | B2 | 3/2008 | Fraser et al. |
| 7,348,964 | B1 | 3/2008 | Gettemy et al. |
| 7,349,052 | B2 | 3/2008 | Wu et al. |
| 7,362,338 | B1 | 4/2008 | Gettemy et al. |
| 7,379,143 | B2 | 5/2008 | Lyu |
| 7,466,373 | B2 | 12/2008 | Xu et al. |
| 7,483,016 | B1 | 1/2009 | Gettemy et al. |
| 2003/0098857 | A1 | 5/2003 | Gettemy et al. |
| 2003/0160755 | A1 | 8/2003 | Gettemy et al. |
| 2004/0046739 | A1 | 3/2004 | Gettemy |
| 2004/0085503 | A1 | 5/2004 | Kim |
| 2005/0139837 | A1 | 6/2005 | Lee |
| 2005/0184974 | A1 | 8/2005 | Gettemy et al. |
| 2005/0212999 | A1 | 9/2005 | Yang |
| 2005/0269580 | A1 | 12/2005 | D'Angelo |
| 2006/0018175 | A1 | 1/2006 | Liljedahl |
| 2006/0066805 | A1 | 3/2006 | Grunnet-Jepsen |
| 2006/0197740 | A1 | 9/2006 | Xu et al. |
| 2006/0203169 | A1 | 9/2006 | Ozawa |
| 2006/0232553 | A1 | 10/2006 | Wong et al. |
| 2006/0256264 | A1 | 11/2006 | Yang |
| 2006/0268560 | A1 | 11/2006 | Wong et al. |
| 2006/0279557 | A1 | 12/2006 | Gettemy |
| 2006/0284895 | A1 | 12/2006 | Marcu et al. |
| 2007/0024583 | A1 | 2/2007 | Gettemy et al. |
| 2007/0052617 | A1 | 3/2007 | Hanson et al. |
| 2007/0069975 | A1 | 3/2007 | Gettemy et al. |
| 2007/0070272 | A1 | 3/2007 | Gettemy et al. |
| 2007/0070282 | A1 | 3/2007 | Shibahara |
| 2007/0115417 | A1 | 5/2007 | Ge et al. |
| 2007/0139586 | A1 | 6/2007 | Gu et al. |
| 2007/0152963 | A1 | 7/2007 | Wong et al. |
| 2007/0222927 | A1 | 9/2007 | Uehara |
| 2007/0229475 | A1 | 10/2007 | Gettemy et al. |
| 2007/0229749 | A1 | 10/2007 | Kaneko |
| 2007/0273714 | A1 | 11/2007 | Hodge et al. |
| 2007/0290989 | A1 | 12/2007 | Gettemy et al. |
| 2007/0296693 | A1 | 12/2007 | Wong et al. |
| 2008/0032755 | A1 | 2/2008 | Fraser et al. |
| 2008/0036948 | A1 | 2/2008 | Zhong et al. |
| 2008/0062139 | A1 | 3/2008 | Hotelling et al. |
| 2008/0062140 | A1 | 3/2008 | Hotelling et al. |
| 2008/0062147 | A1 | 3/2008 | Hotelling et al. |
| 2008/0062148 | A1 | 3/2008 | Hotelling et al. |
| 2008/0068549 | A1 | 3/2008 | Liao |
| 2008/0074400 | A1 | 3/2008 | Gettemy et al. |
| 2008/0083569 | A1 | 4/2008 | Gettemy et al. |
| 2008/0117184 | A1 | 5/2008 | Gettemy |
| 2008/0121898 | A1 | 5/2008 | Yin et al. |
| 2008/0137018 | A1 | 6/2008 | Lin |
| 2008/0143946 | A1 | 6/2008 | Wang |
| 2008/0164056 | A1 | 7/2008 | Gettemy et al. |
| 2008/0180801 | A1 | 7/2008 | Kobayashi |
| 2008/0186440 | A1 | 8/2008 | Lim |
| 2008/0204431 | A1 | 8/2008 | Chung et al. |
| 2008/0225217 | A1 | 9/2008 | Wakabayashi |
| 2008/0231959 | A1 | 9/2008 | Grip |
| 2008/0238813 | A1 | 10/2008 | Gettemy et al. |
| 2008/0246726 | A1 | 10/2008 | Gettemy |
| 2008/0259254 | A1 | 10/2008 | Kikuchi |
| 2008/0303998 | A1 | 12/2008 | Ohta |
| 2008/0309627 | A1 | 12/2008 | Hotelling et al. |
| 2008/0309633 | A1 | 12/2008 | Hotelling et al. |
| 2009/0009442 | A1 | 1/2009 | Galbraith, Jr. et al. |

FOREIGN PATENT DOCUMENTS

| | | |
|---|---|---|
| WO | WO 2008077261 | 7/2008 |

OTHER PUBLICATIONS

U.S. Appl. No. 12/371,342, filed Feb. 13, 2009, Chen et al.
U.S. Appl. No. 12/371,360, filed Feb. 13, 2009, Gu et al.
U.S. Appl. No. 12/371,364, filed Feb. 13, 2009, Chen et al.
U.S. Appl. No. 12/371,368, filed Feb. 13, 2009, Chen et al.
U.S. Appl. No. 12/371,380, filed Feb. 13, 2009, Chen et al.
U.S. Appl. No. 12/371,409, filed Feb. 13, 2009, Xu et al.
U.S. Appl. No. 12/371,452, filed Feb. 13, 2009, Chang et al.
U.S. Appl. No. 12/415,848, filed Mar. 31, 2009, Chen et al.
U.S. Appl. No. 12/236,066, filed Sep. 23, 2008, Gettemy et al.
Jung, Byunghoo, et al.; "Improved Aperture Ratio Through Asymmetric Pixel Electrode Design"; Feb. 13, 1997.

* cited by examiner

ADVANCED PIXEL DESIGN FOR OPTIMIZED DRIVING

BACKGROUND

1. Technical Field

Embodiments of the present disclosure relate generally to display devices and, more particularly, to liquid crystal display (LCD) devices.

2. Description Of The Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery powered devices or in other contexts where it is desirable to minimize power usage.

LCD devices typically include a plurality of picture elements (pixels) arranged in a matrix. The pixels may be driven by scanning line and data line circuitry to display an image that may be perceived by a user. Individual pixels of an LCD device may variably permit light to pass when an electric field is applied to a liquid crystal material in each pixel. Because the liquid crystal material may deteriorate when a DC voltage is applied for an extended period of time, the polarity of a voltage supplied to the pixel may be changed. However, the various polarity inversion techniques may result in common voltage loading or may be complex to implement. Moreover, certain LCD devices, such as in-plane switching (IPS) and fringe-field switching (FFS) display panels, may supply a common voltage (Vcom) to a common electrode respective to each row of pixels. As each row of pixels is activated, resultant common voltage loading may cause crosstalk among the pixels that share the common electrode.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The present disclosure relates to a configuration of a pixel array for a liquid crystal display (LCD) device, which may have reduced common voltage loading characteristics and/or may enable a simplified manner of polarity inversion. In accordance with one embodiment, a device may include a processor, a memory device, and a liquid crystal display having a pixel array including rows and columns of pixels. The pixels of each row of the pixel array may be configured to cause an approximately even amount of common voltage loading to be shared between one of a first plurality of common electrodes and one of a second plurality of common electrodes when the pixels of each row of the pixel array receive a scanning signal and a data signal.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
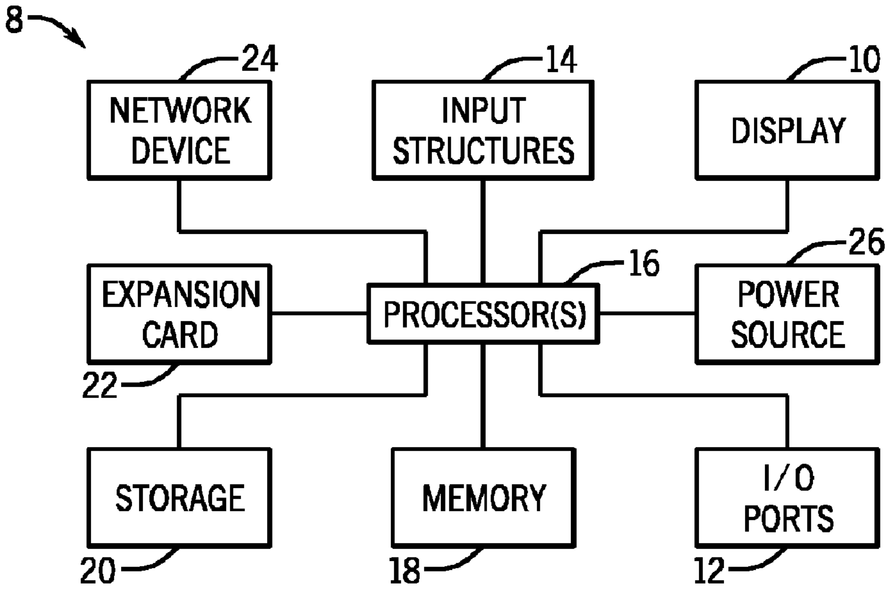
FIG. 1 is a block diagram of exemplary components of an electronic device, in accordance with aspects of the present disclosure.
Figure 3:
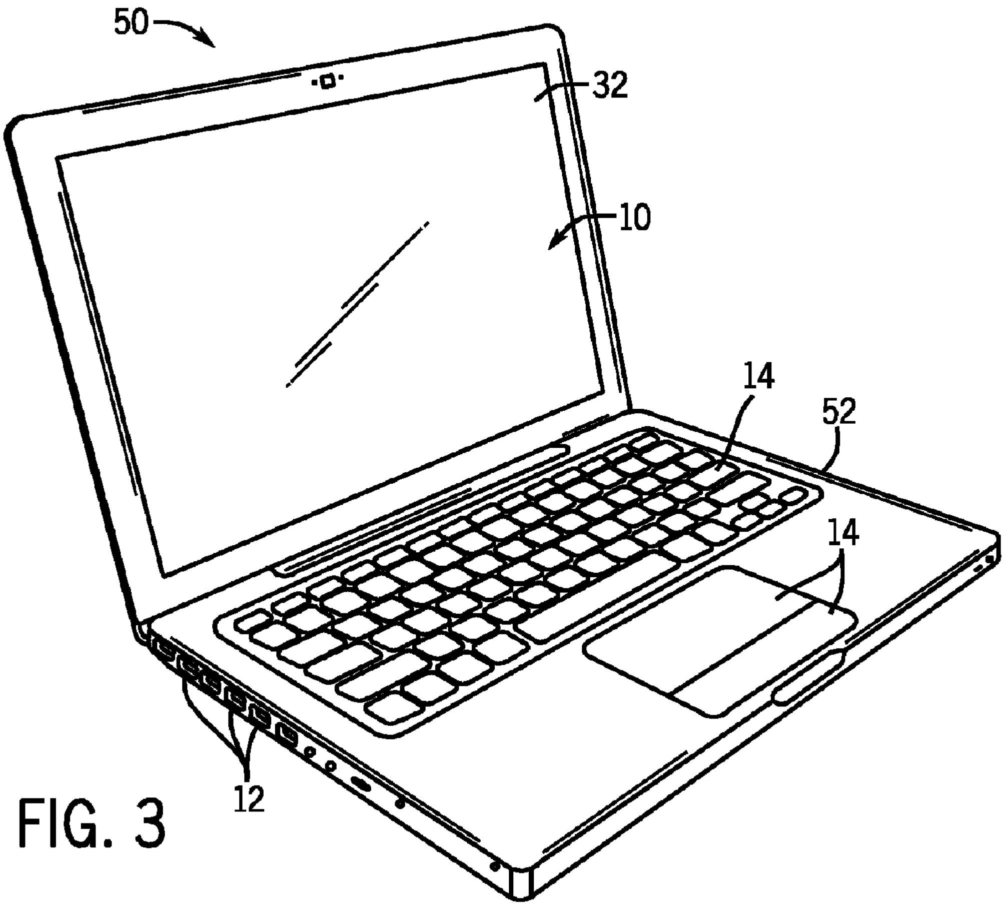
FIG. 3 is a view of a computer in accordance with aspects of the present disclosure.
Figure 2:
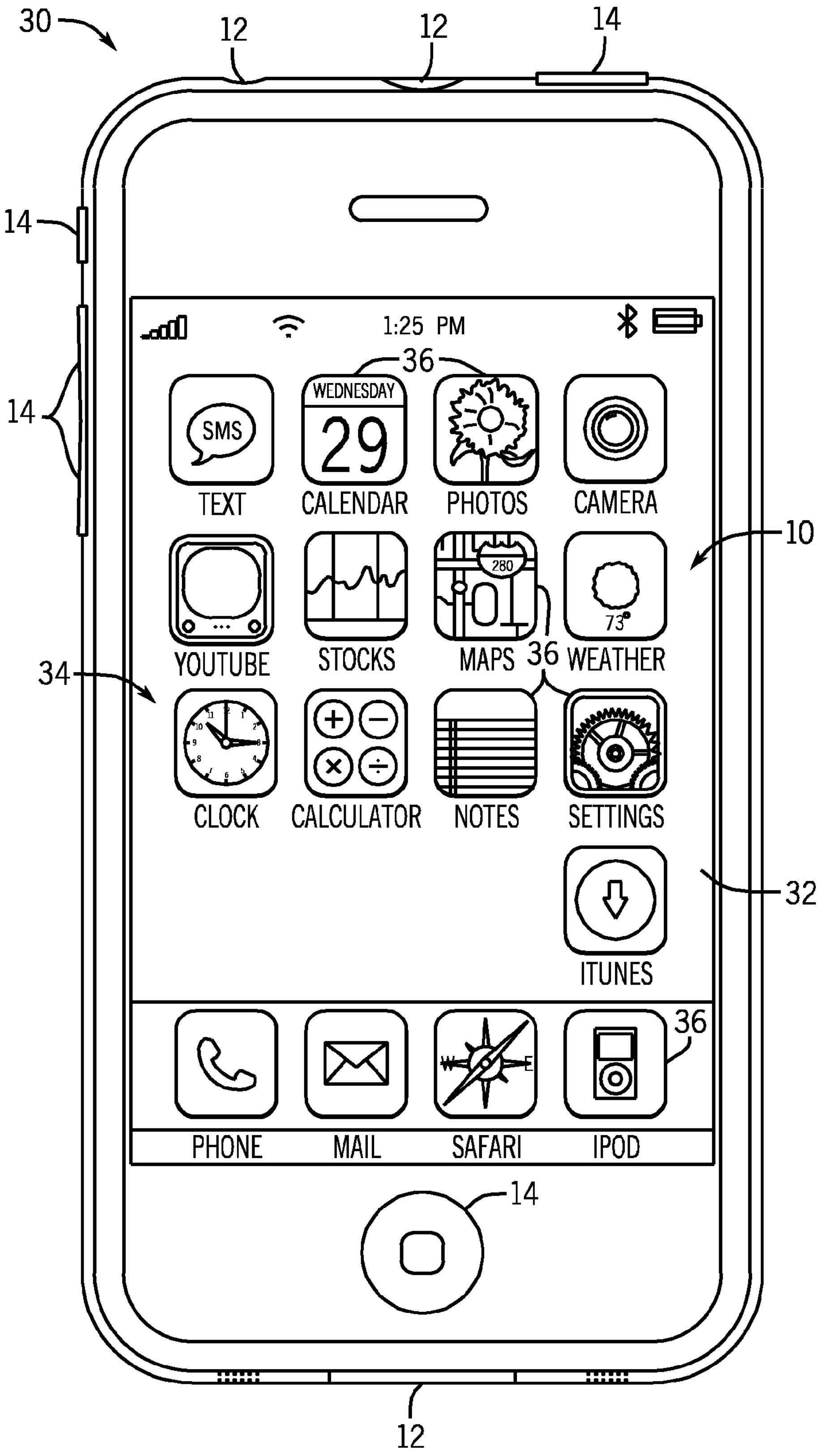
FIG. 2 is a front view of a handheld electronic device in accordance with aspects of the present disclosure.

With the foregoing in mind, a general description of suitable electronic devices using LCD displays having pixel arrangements for improved common voltage loading and/or polarity inversion is provided below. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing comparable display capabilities, may be used in conjunction with the present techniques.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, one or more processors 16, a memory device 18, a non-volatile storage 20, expansion card (s) 22, a networking device 24, and a power source 26.

With regard to each of these components, the display 10 may be used to display various images generated by the device 8. In one embodiment, the display 10 may be a liquid crystal display (LCD). For example, the display 10 may be an LCD employing fringe field switching (FFS), in-plane switching (IPS), or other techniques useful in operating such LCD devices. Additionally, in certain embodiments of the electronic device 8, the display 10 may be provided in conjunction with touch-sensitive element, such as a touch screen, that may be used as part of the control interface for the device 8.

The I/O ports 12 may include ports configured to connect to a variety of external devices, such as a power source, headset or headphones, or other electronic devices (such as handheld devices and/or computers, printers, projectors, external displays, modems, docking stations, and so forth). The I/O ports 12 may support any interface type, such as a universal serial bus (USB) port, a video port, a serial connection port, a IEEE-1394 port, an Ethernet or modem port, and/or an AC/DC power connection port.

The input structures 14 may include the various devices, circuitry, and pathways by which user input or feedback is provided to the processor 16. Such input structures 14 may be configured to control a function of the device 8, applications running on the device 8, and/or any interfaces or devices connected to or used by the electronic device 8. For example, the input structures 14 may allow a user to navigate a displayed user interface or application interface. Examples of the input structures 14 may include buttons, sliders, switches, control pads, keys, knobs, scroll wheels, keyboards, mice, touchpads, and so forth.

In certain embodiments, an input structure 14 and display 10 may be provided together, such an in the case of a touchscreen where a touch sensitive mechanism is provided in conjunction with the display 10. In such embodiments, the user may select or interact with displayed interface elements via the touch sensitive mechanism. In this way, the displayed interface may provide interactive functionality, allowing a user to navigate the displayed interface by touching the display 10.

User interaction with the input structures 14, such as to interact with a user or application interface displayed on the display 10, may generate electrical signals indicative of the user input. These input signals may be routed via suitable pathways, such as an input hub or bus, to the processor(s) 16 for further processing.

The processor(s) 16 may provide the processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a computer-readable medium, such as a memory 18. Such a memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware for the electronic device 8 (such as a basic input/output instruction or operating system instructions), various programs, applications, or routines executed on the electronic device 8, user interface functions, processor functions, and so forth. In addition, the memory 18 may be used for buffering or caching during operation of the electronic device 8.

The components may further include other forms of computer-readable media, such as a non-volatile storage 20, for persistent storage of data and/or instructions. The non-volatile storage 20 may include flash memory, a hard drive, or any other optical, magnetic, and/or solid-state storage media. The non-volatile storage 20 may be used to store firmware, data files, software, wireless connection information, and any other suitable data.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable connector, and may be accessed internally or external to the housing of the electronic device 8. For example, in one embodiment, the expansion card 22 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery or other type of suitable battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone. It should be noted that while the depicted handheld device 30 is provided in the context of a cellular telephone, other types of handheld devices (such as media players for playing music and/or video, personal data organizers, handheld game platforms, and/or combinations of such devices) may also be suitably provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the general electronic device of FIG. 1, the handheld device 30 may allow a user to connect to and communicate through the Internet or through other networks, such as local or wide area networks. The handheld electronic device 30, may also communicate with other devices using short-range connections, such as Bluetooth and near field communication. By way of example, the handheld device 30 may be a model of an iPod® or iPhone® available from Apple Inc. of Cupertino, Calif.

In the depicted embodiment, the handheld device 30 includes an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 30 to facilitate wireless communication.

In the depicted embodiment, the enclosure includes user input structures 14 through which a user may interface with the device. Each user input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

In the depicted embodiment, the handheld device 30 includes a display 10 in the form of an LCD 32. The LCD 32 may be used to display a graphical user interface (GUI) 34 that allows a user to interact with the handheld device 30. The GUI 34 may include various layers, windows, screens, templates, or other graphical elements that may be displayed in all, or a portion, of the LCD 32. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen included in the display 10, or may be selected by a user input structure 14, such as a wheel or button.

The handheld electronic device 30 also may include various input and output (I/O) ports 12 that allow connection of the handheld device 30 to external devices. For example, one I/O port 12 may be a port that allows the transmission and reception of data or commands between the handheld electronic device 30 and another electronic device, such as a computer. Such an I/O port 12 may be a proprietary port from Apple Inc. or may be an open standard I/O port.

In addition to handheld devices 30, such as the depicted cellular telephone of FIG. 2, an electronic device 8 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 8 in the form of a computer may be a model of a MacBook®, MacBook® Pro, MacBook Air®, iMac®, Mac® mini, or Mac Pro® available from Apple Inc. By way of example, an electronic device 8 in the form of a laptop computer 50 is illustrated in FIG. 3 in accordance with one embodiment of the present invention. The depicted computer 50 includes a housing 52, a display 10 (such as the depicted LCD 32), input structures 14, and input/output ports 12.

In one embodiment, the input structures 14 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the LCD 32.

As depicted, the electronic device 8 in the form of computer 50 may also include various input and output ports 12 to allow connection of additional devices. For example, the computer 50 may include an I/O port 12, such as a USB port or other port, suitable for connecting to another electronic device, a projector, a supplemental display, and so forth. In addition, the computer 50 may include network connectivity, memory, and storage capabilities, as described with respect to FIG. 1. As a result, the computer 50 may store and execute a GUI and other applications.

With the foregoing discussion in mind, it may be appreciated that an electronic device 8 in either the form of a handheld device 30 or a computer 50 may be provided with a display 10 in the form of an LCD 32. Such an LCD 32 may be utilized to display the respective operating system and application interfaces running on the electronic device 8 and/or to display data, images, or other visual outputs associated with an operation of the electronic device 8.

In embodiments in which the electronic device 8 includes an LCD 32, the LCD 32 may typically include an array or matrix of picture elements (i.e., pixels). In operation, the LCD 32 generally operates to modulate the transmittance of light through each pixel by controlling the orientation of liquid crystals disposed at each pixel such that the amount of emitted or reflected light emitted by each pixel is controlled. In general, the orientation of the liquid crystals is controlled by a varying electric field associated with each respective pixel, with the liquid crystals being oriented at any given instant by the properties (strength, shape, and so forth) of the electric field.

Different types of LCDs may employ different techniques in manipulating these electrical fields and/or the liquid crystals. For example, certain LCDs employ transverse electric field modes in which the liquid crystals are oriented by applying an in-plane electrical field to a layer of the liquid crystals. Examples of such techniques include in-plane switching (IPS) and fringe field switching (FFS) techniques, which differ in the electrode arrangement employed to generate the respective electrical fields.

While control of the orientation of the liquid crystals in such displays may be sufficient to modulate the amount of light emitted by a pixel, color filters may also be associated with the pixels to allow specific colors of light to be emitted by each pixel. For example, in embodiments where the LCD 32 is a color display, each pixel of a group of pixels may correspond to a different primary color. For example, in one embodiment, a group of pixels may include a red pixel, a green pixel, and a blue pixel, each associated with an appropriately colored filter. The intensity of light allowed to pass through each pixel (by modulation of the corresponding liquid crystals), and its combination with the light emitted from other adjacent pixels, determines what color(s) are perceived by a user viewing the display. As the viewable colors are formed from individual color components (e.g., red, green, and blue) provided by the colored pixels, the colored pixels may also be referred to as unit pixels.

Figure 4:
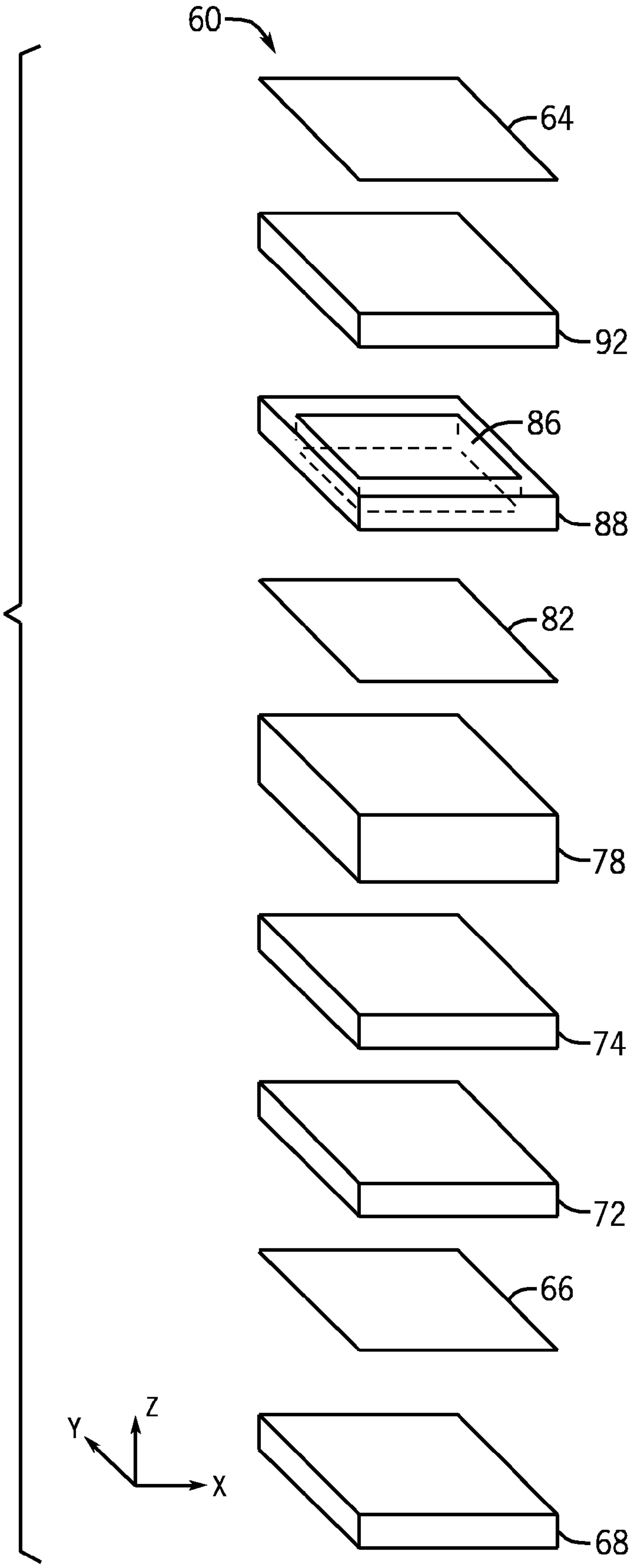
FIG. 4 is an exploded view of exemplary layers of a pixel of a liquid crystal display (LCD) panel, in accordance with aspects of the present disclosure.

With the foregoing in mind, and turning once again to the figures, FIG. 4 depicts an exploded view of different layers of a pixel of an LCD 32. The pixel 60 includes an upper polarizing layer 64 and a lower polarizing layer 66 that polarize light emitted by a backlight assembly 68 or light-reflective surface. A lower substrate 72 is disposed above the polarizing layer 66 and is generally formed from a light-transparent material, such as glass, quartz, and/or plastic.

A thin film transistor (TFT) layer 74 is depicted as being disposed above the lower substrate 72. For simplicity of illustration, the TFT layer 74 is depicted as a generalized structure in FIG. 4. In practice, the TFT layer may itself comprise various conductive, non-conductive, and semiconductive layers and structures which generally form the electrical devices and pathways which drive operation of the pixel 60. For example, in an embodiment in which the pixel 60 is part of an FFS LCD panel, the TFT layer 74 may include the respective data lines, scanning lines, pixel electrodes, and common electrodes (as well as other conductive traces and structures) of the pixel 60. Such conductive structures may, in light-transmissive portions of the pixel, be formed using transparent conductive materials, such as indium tin oxide (ITO). In addition, the TFT layer 74 may include insulating layers (such as a gate insulating film) formed from suitable transparent materials (such as silicon oxide) and semiconductive layers formed from suitable semiconductor materials (such as amorphous silicon). In general, the respective conductive structures and traces, insulating structures, and semiconductor structures may be suitably disposed to form the respective pixel and common electrodes, a TFT, and the respective data and scanning lines used to operate the pixel 60, as described in further detail with regard to FIG. 5. The TFT layer 74 may also include an alignment layer (formed from polyimide or other suitable materials) at the interface with the liquid crystal layer 78.

The liquid crystal layer 78 includes liquid crystal particles or molecules suspended in a fluid or gel matrix. The liquid crystal particles may be oriented or aligned with respect to an electrical field generated by the TFT layer 74. The orientation of the liquid crystal particles in the liquid crystal layer 78 determines the amount of light transmission through the pixel 60. Thus, by modulation of the electrical field applied to the liquid crystal layer 78, the amount of light transmitted though the pixel 60 may be correspondingly modulated.

Disposed on the other side of the liquid crystal layer 78 from the TFT layer 74 may be one or more alignment and/or overcoating layers 82 interfacing between the liquid crystal layer 78 and an overlying color filter 86. The color filter 86, in certain embodiments, may be a red, green, or blue filter, such that each pixel 60 corresponds to a primary color when light is transmitted from the backlight assembly 68 through the liquid crystal layer 78 and the color filter 86.

The color filter 86 may be surrounded by a light-opaque mask or matrix, e.g., a black mask 88 which circumscribes the light-transmissive portion of the pixel 60. For example, in certain embodiments, the black mask 88 may be sized and shaped to define a light-transmissive aperture over the liquid crystal layer 78 and around the color filter 86 and to cover or mask portions of the pixel 60 that do not transmit light, such as the scanning line and data line driving circuitry, the TFT, and the periphery of the pixel 60. In the depicted embodiment, an upper substrate 92 may be disposed between the black mask 88 and color filter 86 and the polarizing layer 64. In such an embodiment, the upper substrate may be formed from light-transmissive glass, quartz, and/or plastic.

Figure 5:
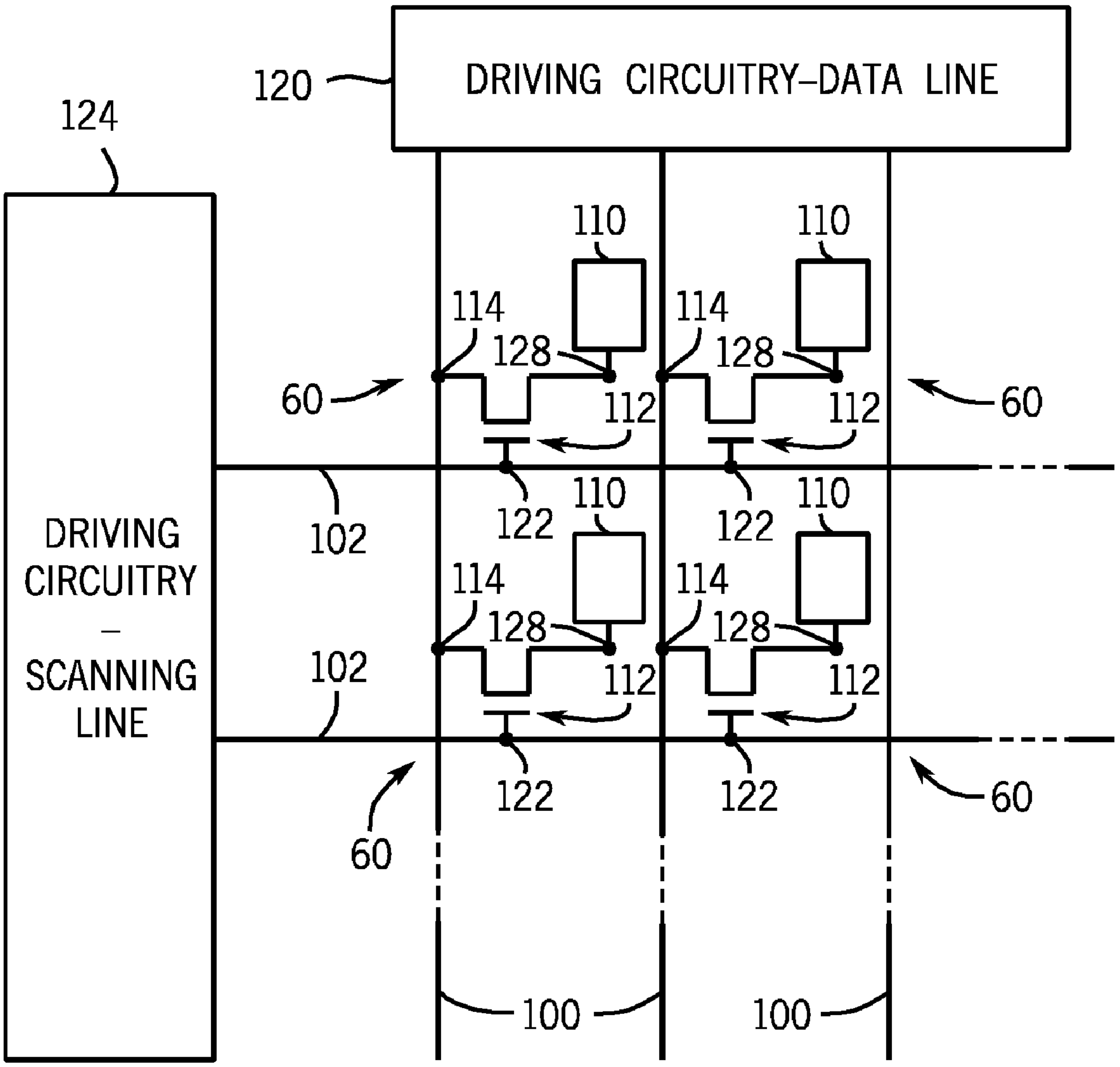
FIG. 5 is a circuit diagram of switching and display circuitry of LCD pixels, in accordance with aspects of the present disclosure.

Referring now to FIG. 5, an example of a circuit view of pixel driving circuitry found in an LCD 32 is provided, and which may be generally described further with reference to FIGS. 12-15 below. For example, such circuitry as depicted in FIG. 5 may be embodied in the TFT layer 74 described with respect to FIG. 4. As depicted, the pixels 60 may be disposed in a matrix that forms an image display region of an LCD 32. In such a matrix, each pixel 60 may be defined by the intersection of data lines 100 and scanning or gate lines 102.

Each pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from respective scanning line driving circuitry 124. In the depicted embodiment, the pixel electrode 110 is electrically connected to a drain 128 of the respective TFT 112.

In one embodiment, the data line driving circuitry 120 sends image signals to the pixels via the respective data lines 100. Such image signals may be applied by line-sequence, i.e., the data lines 100 may be sequentially activated during operation. The scanning lines 102 may apply scanning signals from the scanning line driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

The image signals stored at the pixel electrode 110 may be used to generate an electrical field between the respective pixel electrode 110 and a common electrode. Such an electrical field may align liquid crystals within the liquid crystal layer 78 (FIG. 4) to modulate light transmission through the liquid crystal layer 78. In some embodiments, a storage capacitor may also be provided in parallel to the liquid crystal capacitor formed between the pixel electrode 110 and the common electrode to prevent leakage of the stored image signal at the pixel electrode 110. For example, such a storage capacitor may be provided between the drain 128 of the respective TFT 112 and a separate capacitor line.

Figure 6:
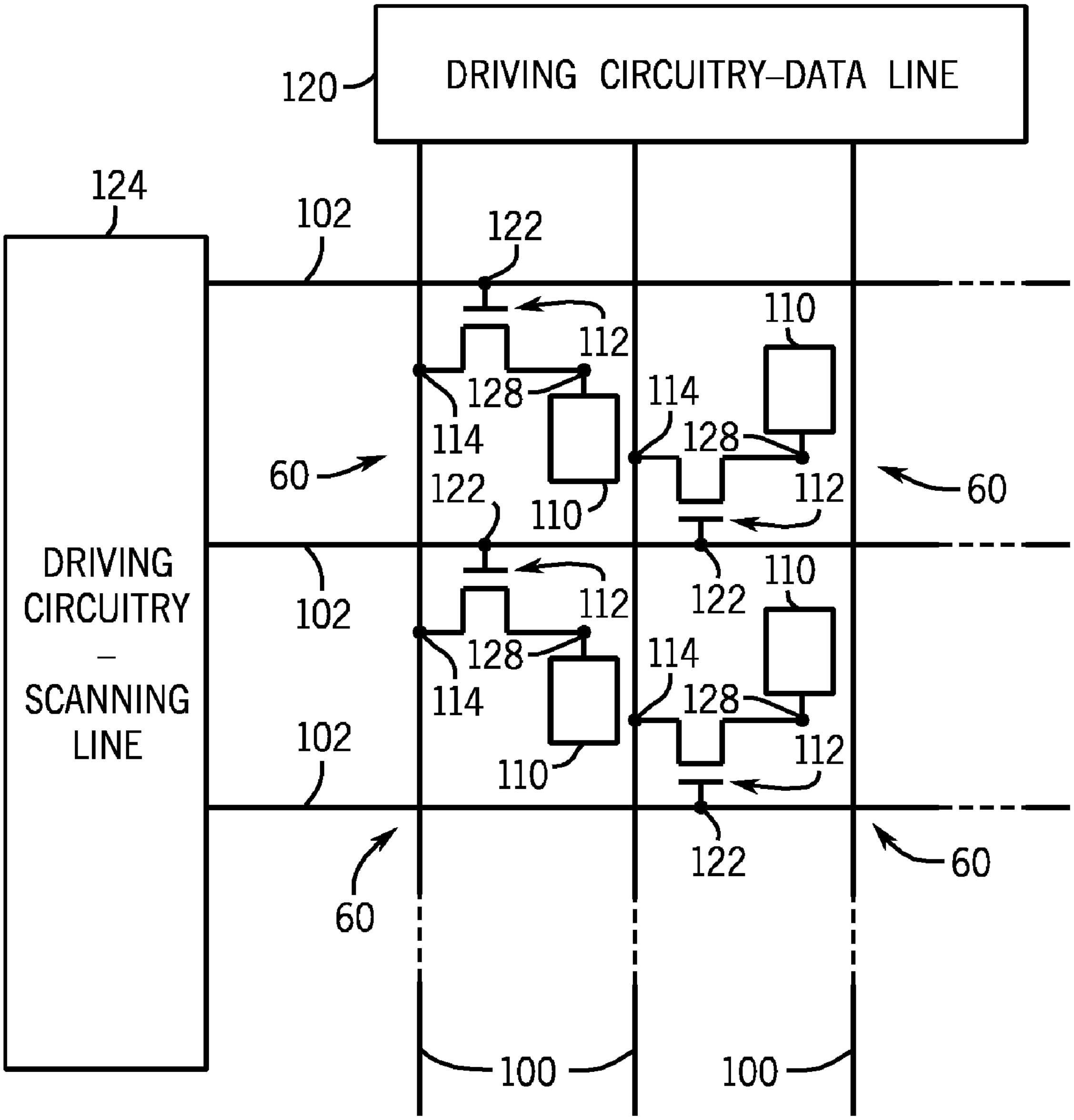
FIG. 6 is another circuit diagram of switching and display circuitry of LCD pixels, in accordance with aspects of the present disclosure.

FIG. 6 represents an example of a circuit view of alternative pixel driving circuitry found in an LCD 32, which may generally be described with reference to FIGS. 7-11. As noted above with reference to FIG. 5, such circuitry as depicted in FIG. 6 may be embodied in the TFT layer 74 of FIG. 4. As depicted, the pixels 60 may be disposed in a matrix that forms an image display region of an LCD 32. In such a matrix, each pixel 60 may be defined by the intersection of data lines 100 and scanning or gate lines 102.

Each pixel 60 includes a pixel electrode 110 and thin film transistor (TFT) 112 for switching the pixel electrode 110. In the depicted embodiment, the source 114 of each TFT 112 is electrically connected to a data line 100, extending from respective data line driving circuitry 120. Similarly, in the depicted embodiment, the gate 122 of each TFT 112 is electrically connected to a scanning or gate line 102, extending from respective scanning lines driving circuitry 124. In contrast to the embodiment of FIG. 5, the gate 122 of each successive TFT 112 may alternatingly couple to an upper or lower scanning or gate line 102 in each row of pixels 60. Thus, as illustrated in FIG. 6, a first pixel 60 in a row of pixels may connect to an upper scanning or gate line 102 and the second pixel 60 in the same row of pixels may connect to a lower scanning or gate line 102. As in the embodiment depicted in FIG. 5 above, the pixel electrode 110 is electrically connected to a drain 128 of the respective TFT 112.

In one embodiment, the data line driving circuitry 120 sends image signals to the pixels via the respective data lines 100. Such image signals may be applied by line-sequence, i.e., the data lines 100 may be sequentially activated during operation. The scanning lines 102 may apply scanning signals from the scanning line driving circuitry 124 to the gate 122 of each TFT 112 to which the respective scanning lines 102 connect. Such scanning signals may be applied by line-sequence with a predetermined timing and/or in a pulsed manner.

Each TFT 112 serves as a switching element which may be activated and deactivated (i.e., turned on and off) for a predetermined period based on the respective presence or absence of a scanning signal at the gate 122 of the TFT 112. When activated, a TFT 112 may store the image signals received via a respective data line 100 as a charge in the pixel electrode 110 with a predetermined timing.

The image signals stored at the pixel electrode 110 may be used to generate an electrical field between the respective pixel electrode 110 and a common electrode. Such an electrical field may align liquid crystals within the liquid crystal layer 78 (FIG. 4) to modulate light transmission through the liquid crystal layer 78. For at least this reason, common voltage loading may occur across a common electrode shared by each row of pixels 60 when each TFT 112 is activated. As described in greater detail below, common voltage loading may be reduced using the configuration represented by the circuit diagram of FIG. 6. In some embodiments, a storage capacitor may also be provided in parallel to the liquid crystal capacitor formed between the pixel electrode 110 and the common electrode to prevent leakage of the stored image signal at the pixel electrode 110. For example, such a storage capacitor may be provided between the drain 128 of the respective TFT 112 and a separate capacitor line.

Figure 7:
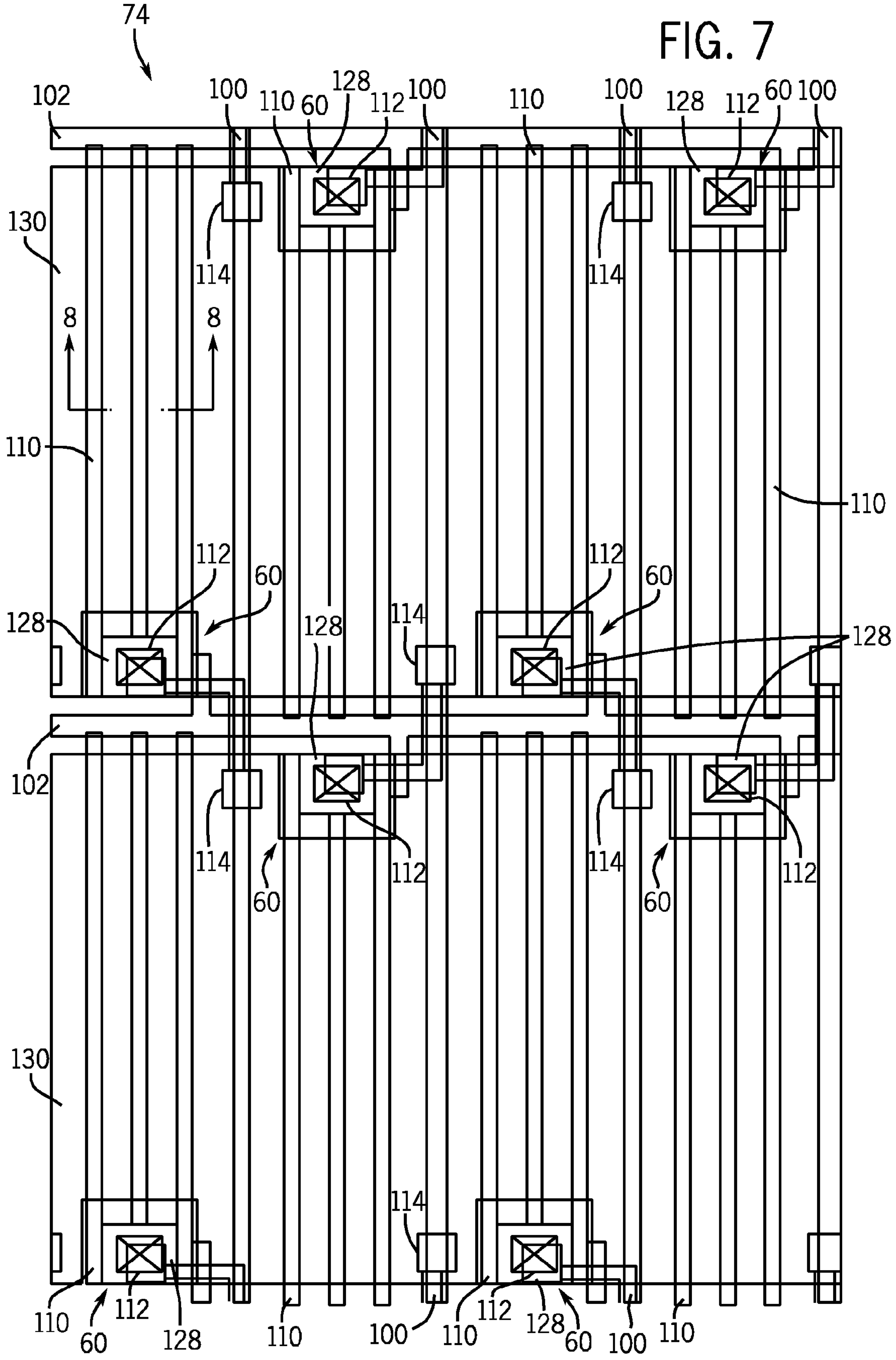
FIG. 7 is a simplified plan view of a pixel arrangement for an LCD panel, in accordance with aspects of the present disclosure.

FIG. 7 is a simplified plan view of an embodiment of the TFT layer 74 generally corresponding to the circuit diagram of FIG. 6. Each of the pixels 60 of the TFT layer 74 includes a pixel electrode 110 and thin film transistor (TFT) 112 for switching the pixel electrode 110. Beneath each pixel electrode is a common electrode 130 shared by a respective row of pixels 60 and supplied with a common voltage (Vcom). The source 114 of each TFT 112 is coupled to one of the data lines 100, while the gate 122 of each TFT 112 is electrically connected to a scanning or gate line 102. As described above with reference to FIG. 6, the gate 122 of each TFT 112 may alternatingly couple to an upper or lower scanning or gate line 102 in each row of pixels 60. Thus, one pixel 60 in a row of pixels may connect to a lower scanning or gate line 102, while the next pixel 60 in the same row of pixels may connect to an upper scanning or gate line 102. As in the embodiment of FIG. 6 above, the pixel electrode 110 is electrically connected to a drain 128 of the respective TFT 112.

Each common electrode 130 extends across a row of pixels 60. When one scanning or gate line 102 supplies a scanning signal, every other pixel 60 of a first row is activated and every other pixel 60 of a second row is activated, drawing upon a common voltage (Vcom) supplied by two common electrodes 130 associated with the adjacent rows of pixels 60. Because more than one common electrode supplies the common voltage for the pixels 60 activated by the scanning signal provided by the scanning or gate line 102, common voltage loading may be reduced.

Figure 8:
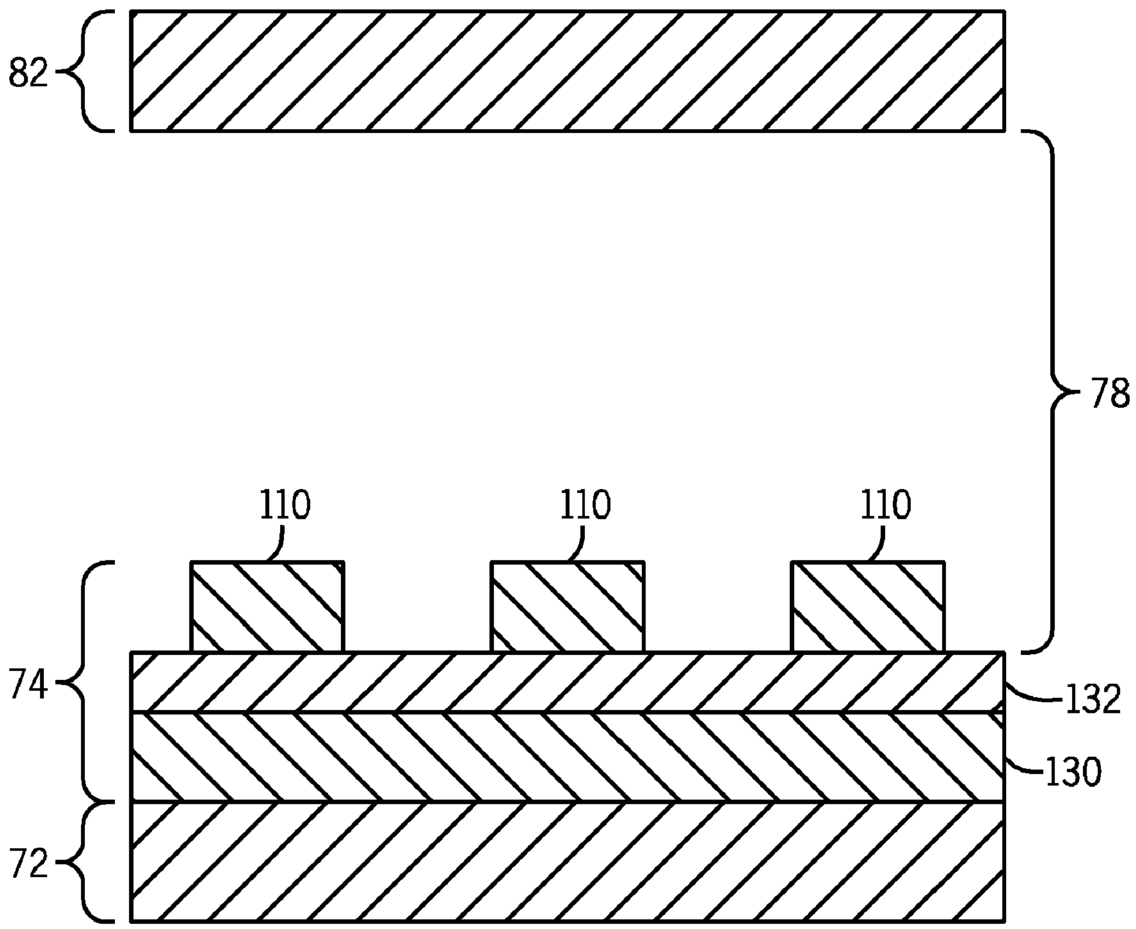
FIG. 8 is a cross-sectional view of a pixel of the pixel arrangement of FIG. 7, in accordance with aspects of the present disclosure.

FIG. 8 is a cross-sectional view of one pixel 60 of the TFT layer 74 of FIG. 7 along cut lines 8-8, further including the lower substrate 72, the liquid crystal layer 78, and the one or more alignment and/or overcoating layers 82. In the embodiment of FIG. 8, the common electrode 130 is located above the pixel electrode 110, separated by an insulating layer 132. As such, the pixel 60 may be configured for fringe-field switching (FFS).

Figure 9:
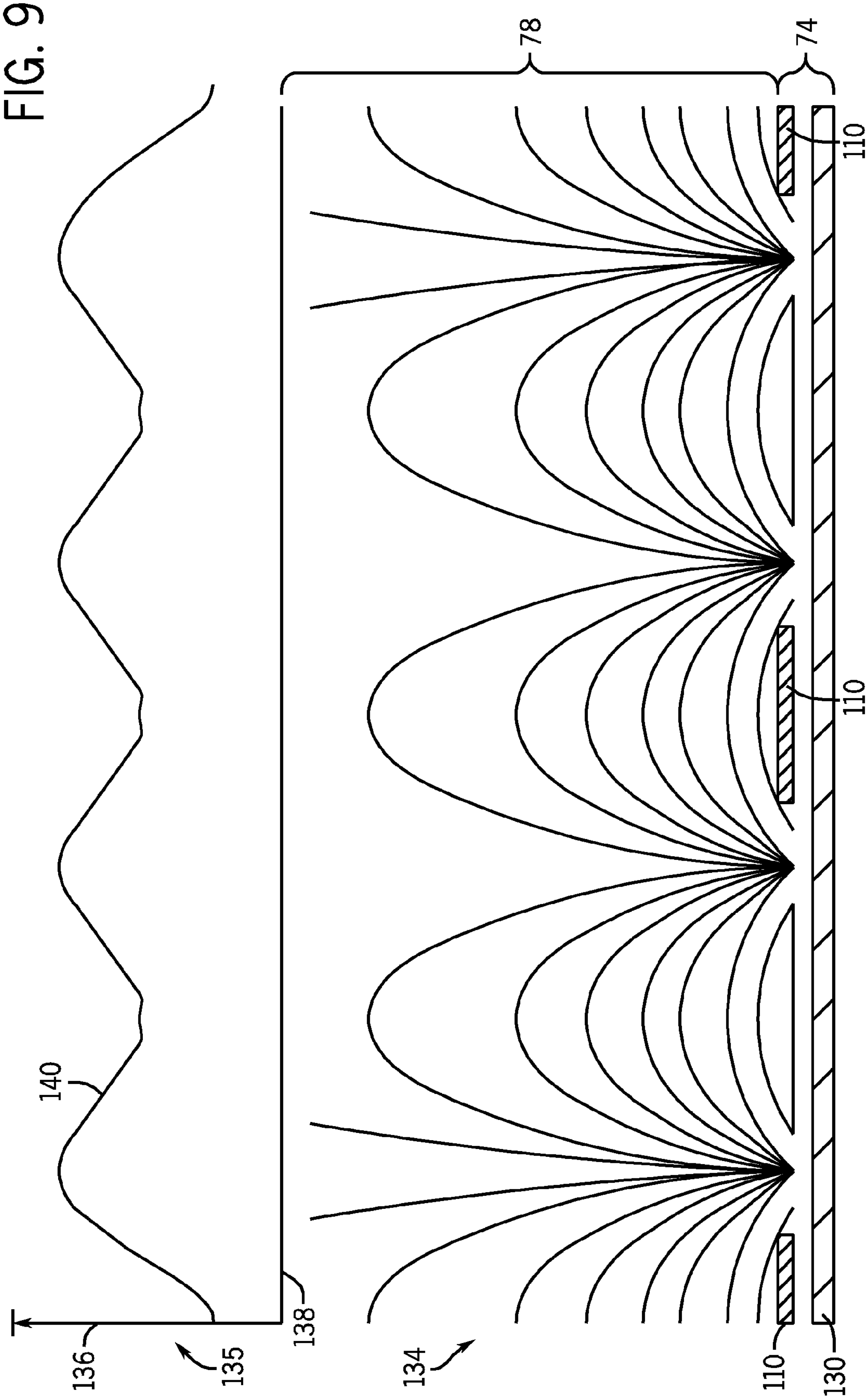
FIG. 9 is a schematic view of the transmittance of light through the pixel of FIG. 8, in accordance with aspects of the present disclosure.

When the pixel 60 is activated, the pixel electrode 110 may receive a data voltage signal from the source or data line 100, representing a video signal for display on the pixel 60. As shown in FIG. 9, an electric field 134 may form between fingers of the pixel electrode 110 and the common electrode 130, changing the alignment of the liquid crystal layer 78 and allowing an amount of light corresponding to the electric field 134 to pass through the liquid crystal layer 78.

A graph 135 illustrates the transmittance of light across the width of the pixel 60 when the electric field 134 has aligned the liquid crystal layer 78 to allow light to pass. In the graph 135, an ordinate 136 illustrates a relative amount of light transmittance through the pixel 60, and an abscissa 138 represents a distance across the width of the pixel 60. A transmittance curve 140 illustrates that in the instant example involving fringe field switching (FFS), the transmittance remains relatively stable across the width of the pixel 60.

The electric field 134 may generally achieve a particular transmittance regardless of the polarity of the electric field 134. However, it may be desirable to periodically invert the polarity of the electric field 134 to prevent degradation of the liquid crystal layer 78. The polarity of the electric field 134 may vary depending on the data voltage supplied by the source or data line 100 for the pixel electrode 110 and the common voltage supplied by the common electrode 130. As such, either the data voltage supplied by the source or data line 100, the common voltage supplied by the common electrode 130, or both may be varied to change the polarity of the electric field 134. For example, to achieve an electric field 134 of the same magnitude but of the opposite polarity, the data voltage supplied by the source or data line 100 may remain unchanged while the common voltage supplied by the common electrode 130 may be inverted.

Figure 10:
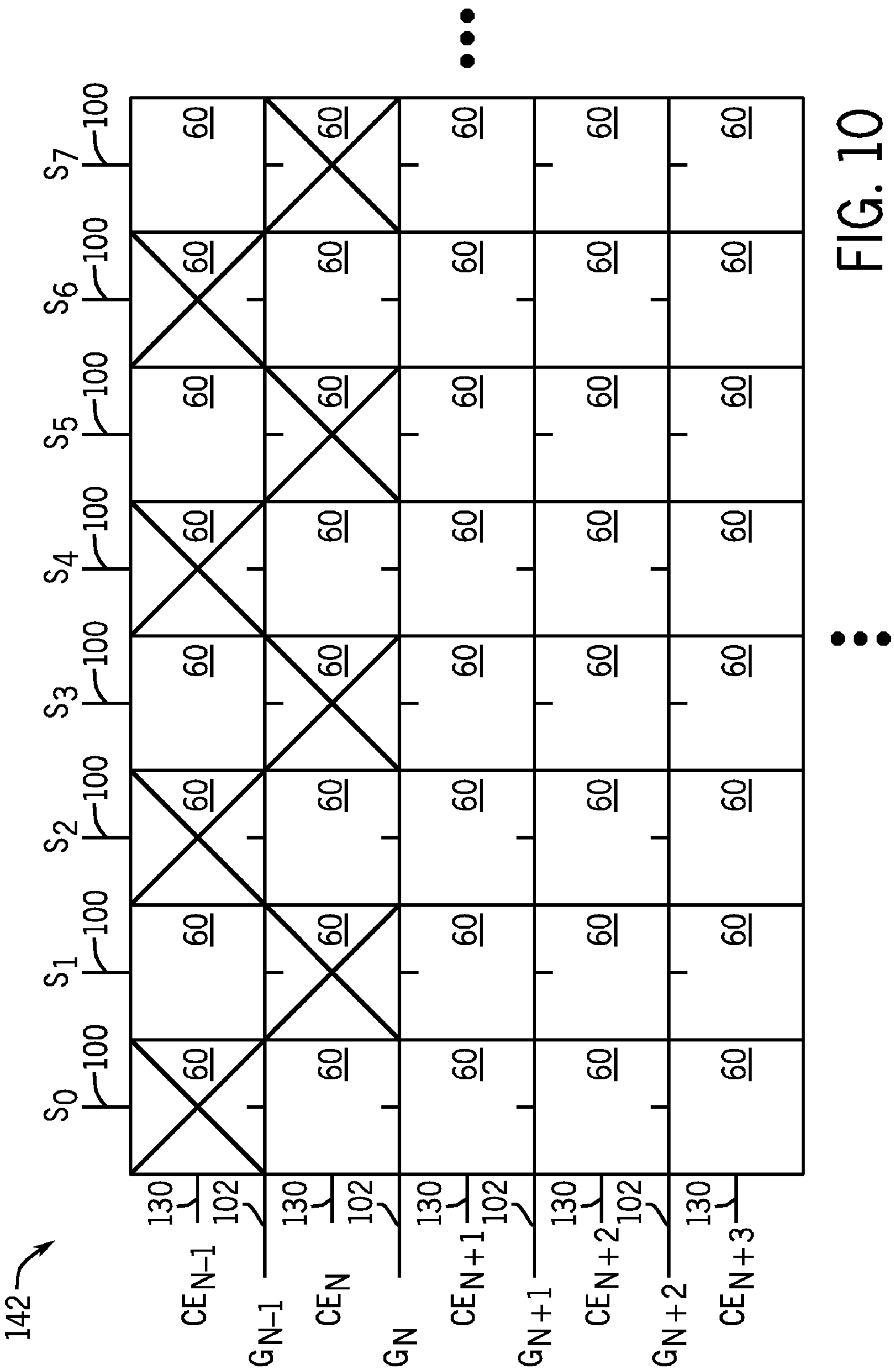
FIG. 10 is a schematic diagram illustrating the activation of a first row of pixels using the pixel arrangement of FIG. 7, in accordance with aspects of the present disclosure.
Figure 11:
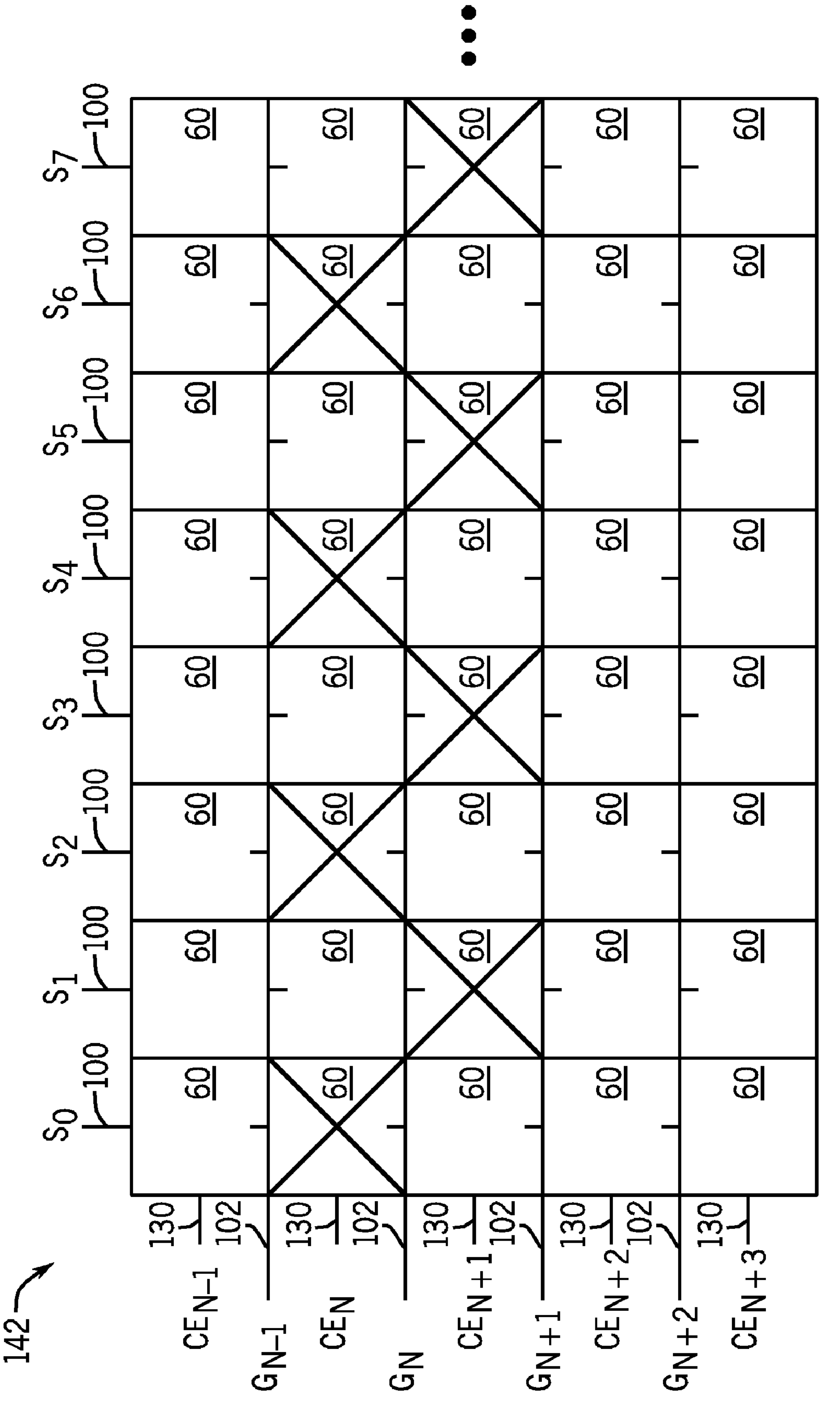
FIG. 11 is a schematic diagram illustrating the activation of a second row of pixels using the pixel arrangement of FIG. 7, in accordance with aspects of the present disclosure.

FIGS. 10 and 11 are schematic views of a pixel array 142 configured in accordance with the embodiment of FIG. 7. As shown in FIGS. 10 and 11, each pixel 60 of each row of the pixel array 142 may share a respective common electrode 130 (e.g., one of the common electrodes $CE_{N-1}$ through $CE_{N+3}$) and each column may share a respective source or data line 100 (e.g., one of the data lines $S_0$ through $S_7$). Each scanning or gate line 102 (e.g., gate lines $G_{N-1}$ through $G_{N+2}$) may alternately connect to pixels 60 of a row above or below the respective scanning or gate line 102.

To store a frame of video data on the pixel array 142, each scanning or gate line 102 may supply a scanning signal one at a time, at which time data signals may be supplied by the data lines 100. For example, a scanning signal may be applied first to the gate line $G_{N-1}$, as shown in FIG. 10, and next to the gate line $G_N$, as illustrated in FIG. 11. Turning first to FIG. 10, when the pixels 60 connected to the gate line $G_{N-1}$ receive a scanning signal, an approximately equal number of pixels 60 may cause common voltage loading from the common electrodes 130 $CE_{N-1}$ and $CE_N$ to be shared approximately evenly. Thus, approximately half of the common voltage loading may derive from $CE_{N-1}$ in an alternating pattern and approximately half from $CE_N$. Turning next to FIG. 11, when the pixels 60 connected to the gate line $G_N$ receive a similar scanning signal, an approximately equal number of pixels 60 may cause common voltage loading from the common electrodes 130 $CE_N$ and $CE_{N+1}$ to be shared approximately evenly. Thus, at no point does common voltage loading burden a single common electrode 130 and, accordingly, resultant crosstalk may be reduced. Crosstalk may be further reduced because the pixels 60 that are activated with each scanning signal are not directly vertically adjacent or directly horizontally adjacent to any other currently activated pixels 60.

Figure 12:
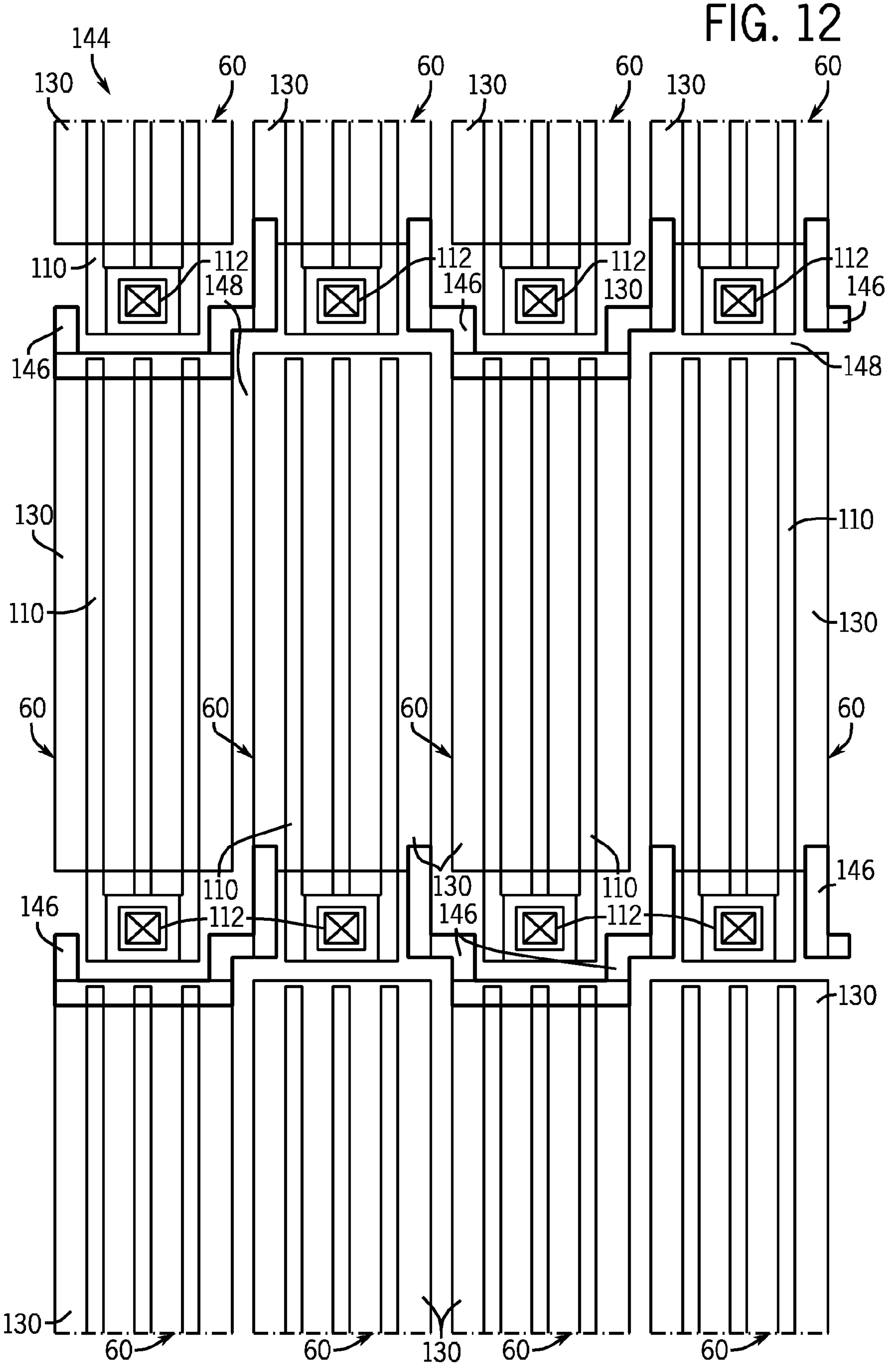
FIG. 12 is a simplified plan view of another pixel arrangement for an LCD panel, in accordance with aspects of the present disclosure.

FIGS. 12-16 describe a pixel arrangement 144 representing an alternative embodiment. Turning first to FIG. 12, in the pixel arrangement 144, a common electrode 130 may be shared by two or more rows of pixels 60. Each pixel 60 in a row of pixels 60 may have a respective pixel electrode 110 connected to a TFT 112. In contrast to the embodiment illustrated in FIGS. 7-11, all TFTs 112 for a given row of pixels 60 may share the same scanning or gate line 102 (not illustrated). A metal interconnect 146 may connect each of the common electrodes 130 respectively to pixels 60 of alternating rows, such that even-numbered pixels 60 of a given row may share one common electrode 130 with odd-numbered pixels 60 of an adjacent rows. The metal interconnect 146 may be constructed of Indium Tin Oxide (ITO), and may alternatingly connect an upper and lower adjacent row of pixels 60. In this way, when a scanning signal supplied by a scanning or gate line 102 activates a row of pixels 60, common voltage loading will be shared approximately evenly between two common electrodes 130.

Figure 13:
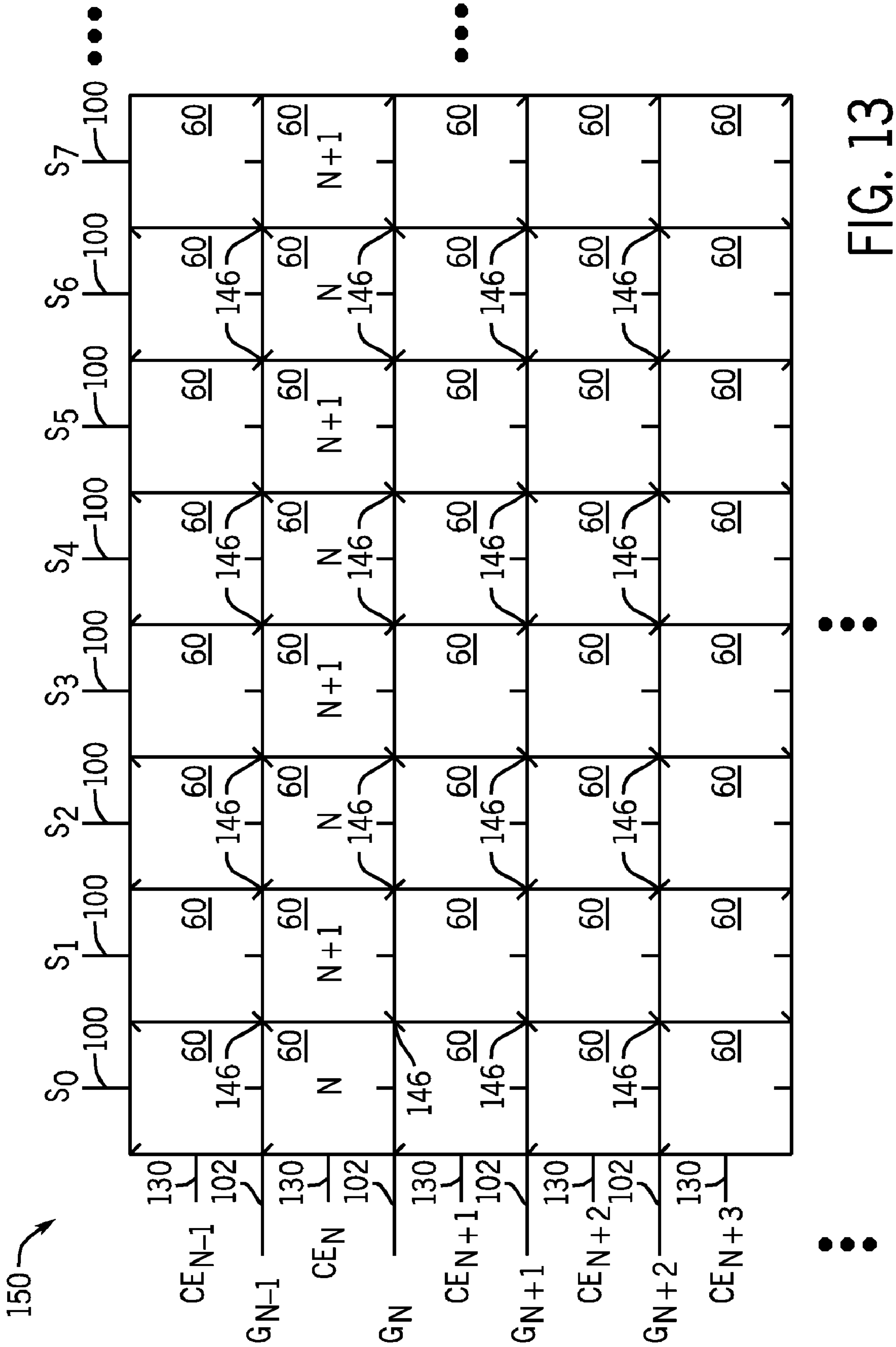
FIG. 13 is a schematic diagram illustrating the activation of a row of pixels using the pixel arrangement of FIG. 12, in accordance with aspects of the present disclosure.
Figure 14:
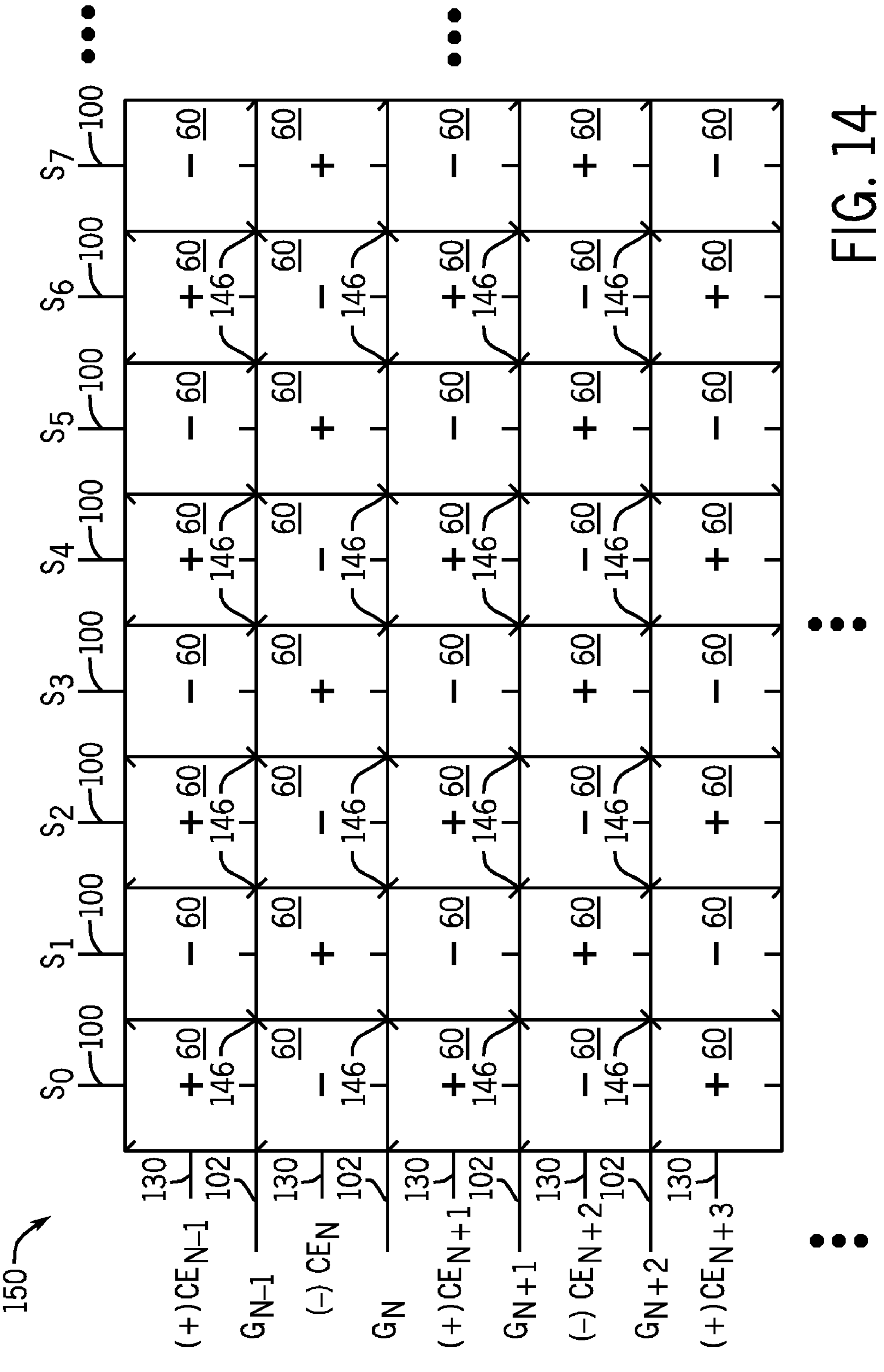
FIG. 14 is a schematic diagram illustrating the activation of a first frame of pixels using the pixel arrangement of FIG. 12, in accordance with aspects of the present disclosure.
Figure 15:
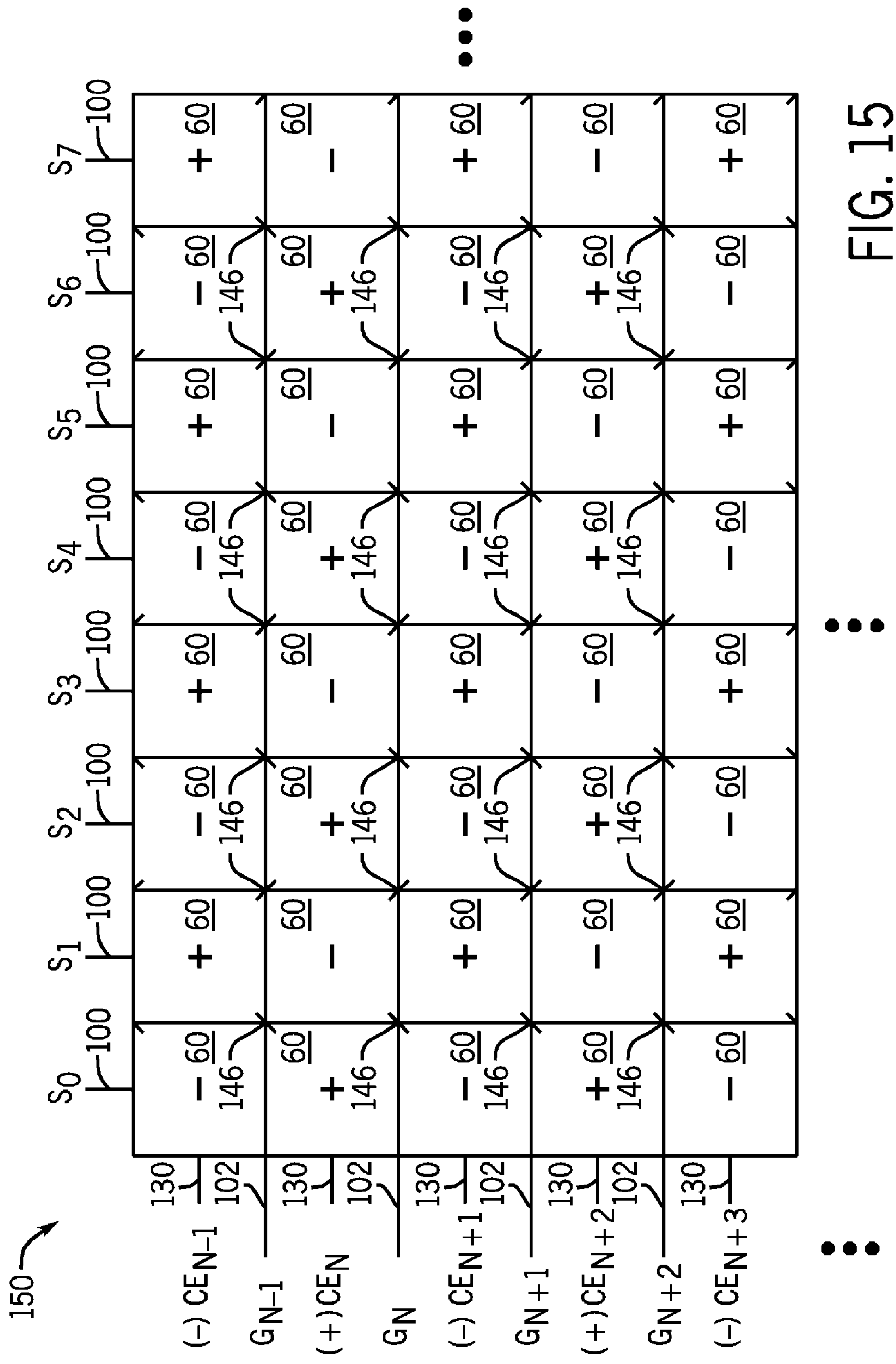
FIG. 15 is a schematic diagram illustrating the activation of a second frame of pixels using the pixel arrangement of FIG. 12, in accordance with aspects of the present disclosure.

FIGS. 13-15 are schematic views of a pixel array 150 configured in accordance with the embodiment of FIG. 12. Particularly, FIG. 13 illustrates the distribution of common voltage loading across multiple common electrodes 130 of the pixel array 150, while FIGS. 14 and 15 illustrate a manner of performing polarity inversion with the pixel array 150. As shown in FIGS. 13-15, each pixel 60 of each row of the pixel array 150 may be connected to a respective scanning or gate line 102 (e.g., gate lines $G_{N-1}$ through $G_{N+2}$), and each column may share a respective source or data line 100 (e.g., one of the data lines $S_0$ through $S_7$). Each common electrode 130 (e.g., one of the common electrodes $CE_{N-1}$ through $CE_{N+3}$) may connect respectively to pixels 60 of alternating rows, such that even-numbered pixels 60 of a given row may share one common electrode 130 with odd-numbered pixels 60 of an adjacent rows. The metal interconnects 146 are illustrated schematically as connecting the pixels 60 in zig-zag patterns across the width of the pixel array 150.

To store a frame of video data on the pixel array 150, each scanning or gate line 102 may supply a scanning signal one at a time, at which time data signals may be supplied by the data lines 100. For example, when a scanning signal is applied to the gate line $G_N$, as shown in FIG. 13, common voltage loading may be shared between two common electrodes 130. Particularly, because of the pattern in which the common electrodes 130 connect to pixels 60 throughout the pixel array 150, every other pixel 60 activated by the gate line $G_N$ receives a common voltage from $CE_N$ or $CE_{N+1}$, respectively. Thus, as with the pixel array 142 of FIGS. 10 and 11, at no point does common voltage loading in the pixel array 150 burden a single common electrode 130, which may accordingly reduce resultant crosstalk. Crosstalk may be further reduced if the effective polarity of the common voltage (Vcom) alternates between adjacent pixels 60 (as described below with reference to FIGS. 14 and 15). Under such circumstances, the pixels 60 that are activated with each scanning signal are not directly vertically adjacent or directly horizontally adjacent to any other currently activated pixels 60 drawing upon the same polarity of common voltage (Vcom).

FIGS. 14 and 15 illustrate a simplified manner of effectively performing dot inversion using the pixel array 150. Particularly, FIG. 14 illustrates the effective polarity of the common voltage (Vcom) supplied to each pixel 60 via the common electrodes 130 for an even-numbered frame, and FIG. 15 illustrates the effective polarity of the common voltage (Vcom) supplied to each pixel 60 for an odd-numbered frame. As used herein, an "effective polarity" of the common voltage (Vcom) signifies a common voltage (Vcom) that may cause the electric field 134 of an activated pixel 60 to flow in one direction or another. As such, the effective polarity of the common voltage may depend on the voltage of the data signals applied across the data lines 100. For example, the transmittance of one pixel 60 may be maintained during two frames of video data by maintaining the magnitude of the electric field 134, even though the polarity of the electric field 134 may change.

Turning to FIG. 14, for even-numbered frames of video data, the effective polarity of the common voltage (Vcom) supplied to each common electrode 130 may alternate. Thus, for example, the common electrode $CE_{N-1}$ may receive a positive effective polarity of the common voltage (Vcom), the common electrode $CE_N$ may receive a negative effective polarity of the common voltage (Vcom), etc. Each scanning or gate line 102 may supply a scanning signal one at a time, at which time data signals may be supplied by the data lines 100 to pixels 60 of the activated row of pixels 60, until one entire frame of video data has been stored into the pixels 60 of the pixel array 150. Based on the effective polarity of the common voltage (Vcom) supplied to the common electrodes 130 and the data signals supplied by the data lines 102, the electric fields 134 of the pixels 60 of the pixel array 150 may generally carry polarities as shown in FIG. 14.

Turning to FIG. 15, for odd-numbered frames of video data, the effective polarity of the common voltage (Vcom) supplied to each common electrode 130 may be opposite that supplied during even-numbered frames. Thus, for example, the common electrode $CE_{N-1}$ may receive a negative effective polarity of the common voltage (Vcom), the common electrode $CE_N$ may receive a positive polarity of the common voltage (Vcom), etc. Each scanning or gate line 102 may supply a scanning signal one at a time, at which time data signals may be supplied by the data lines 100 to pixels 60 of the activated row of pixels 60, until one entire frame of video data has been stored into the pixels 60 of the pixel array 150. Based on the effective polarity of the common voltage (Vcom) supplied to the common electrodes 130 and the data signals supplied by the data lines 102, the electric fields 134 of the pixels 60 of the pixel array 150 may generally carry polarities as shown in FIG. 15.

Figure 16:
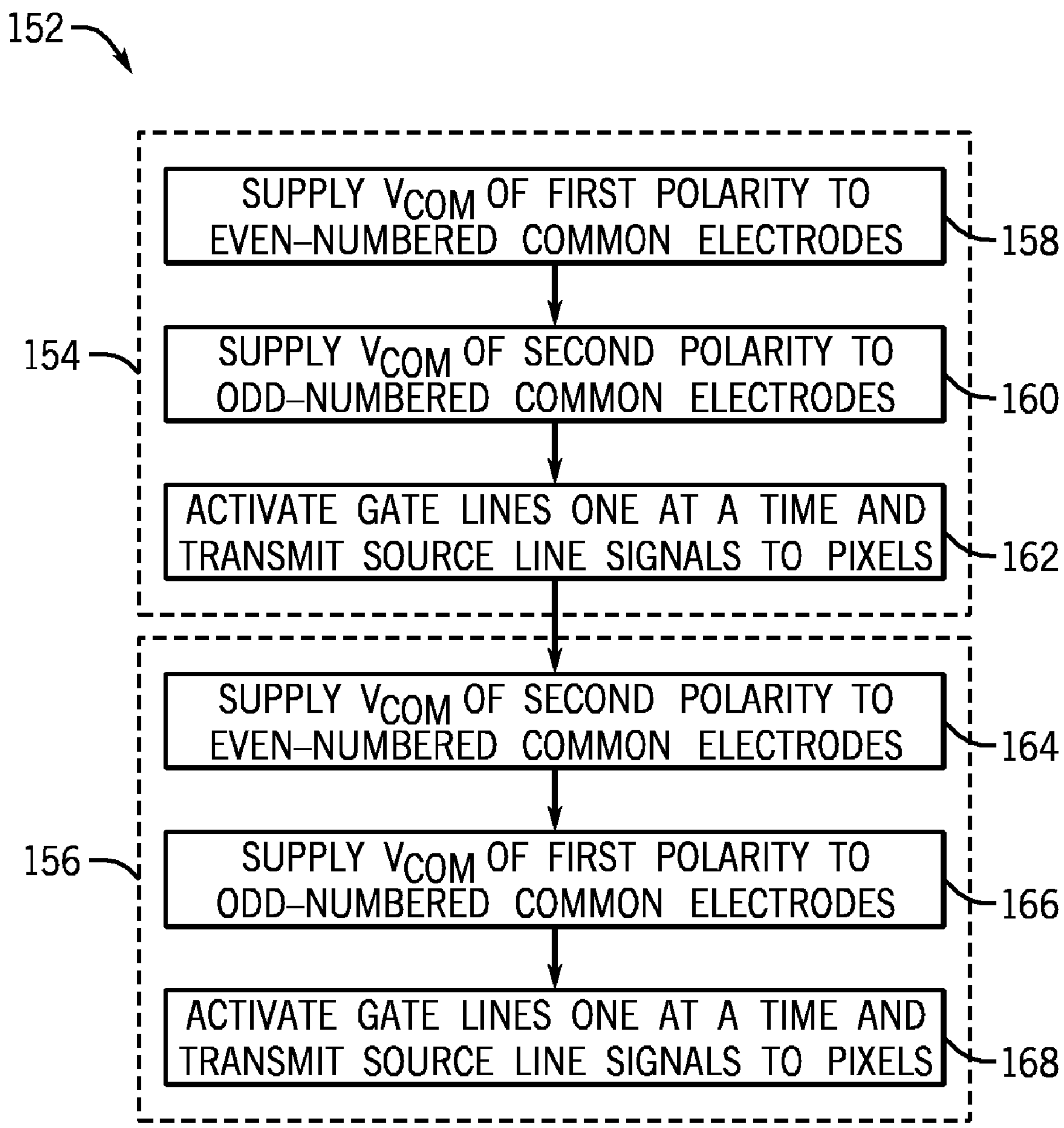
FIG. 16 is a flowchart describing a method of polarity inversion for a frame of pixels using the pixel arrangement of FIG. 12, in accordance with aspects of the present disclosure.

FIG. 16 is a flowchart 152 describing the simplified manner of effectively performing dot inversion using the pixel array 150 as generally illustrated above with reference to FIGS. 14 and 15. The flowchart 152 generally describes a first subprocess 154 of programming a first frame, and a second subprocess 156 of programming a second frame. The first subprocess 154 of the flowchart 152 may begin with a first step 156, in which a common voltage (Vcom) of a first effective polarity (e.g., a positive effective polarity) may be supplied to even-numbered common electrodes of the pixel array 150. In a next step 158, a common voltage (Vcom) of a second effective polarity (e.g., a negative effective polarity) may be supplied to odd-numbered common electrodes of the pixel array 150. Thereafter, as noted by step 162, the scanning or gate lines 102 of the pixel array 150 may be activated one at a time. While each row of pixels 60 is activated, data signals may be supplied to the activated pixels via the source or data lines 100. When all rows of pixels 60 have been activated, the first subprocess 154 of programming the first frame of video data may be complete. Performing steps 158-160 may cause the electric fields 134 of every directly vertically adjacent and directly horizontally adjacent pixel 60 to alternate polarities, thus reducing crosstalk and/or flicker.

Because the liquid crystal layer 78 of each pixel 60 may degrade if the polarity of the electric field 134 of each pixel 60 is not periodically changed, in the second subprocess 156 of the flowchart 152, the polarities of the electric field 134 may be inverted. The second subprocess 156 of programming the second frame of video data may begin with a first step 164, in which a common voltage (Vcom) of the second effective polarity (e.g., a negative effective polarity) may be supplied to even-numbered common electrodes of the pixel array 150. In a next step 166, a common voltage (Vcom) of the first effective polarity (e.g., a positive effective polarity) may be supplied to odd-numbered common electrodes of the pixel array 150. Thereafter, in step 168, the scanning or gate lines 102 of the pixel array 150 may be activated one at a time. While each row of pixels 60 is activated, data signals may be supplied to the activated pixels via the source or data lines 100. When all rows of pixels 60 have been activated, the second subprocess 154 of programming the second frame of video data may be complete. If, as is likely, additional frames of video data are to be displayed on the pixel array 150, the process may thereafter return to step 158.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A device comprising:

a processor;

a memory device operably coupled to the processor and configured to store video data; and a liquid crystal display configured to display the video data by one video frame at a time, the liquid crystal display having a pixel array including rows and columns of pixels, each pixel including:

a pixel electrode;

a portion of either one of a first plurality of common electrodes or one of a second plurality of common electrodes configured to generate an electric field in conjunction with the pixel electrode, wherein the electric field is configured to modulate light passing through the pixel; and a transistor having a gate connected to one of a plurality of gate lines of the pixel array and a source connected to one of a plurality of source lines of the pixel array, wherein the transistor is configured to provide a data signal from the source line to the pixel electrode when a scanning signal is received on the gate line;

wherein the pixels of each row of the pixel array are configured to cause an approximately even amount of common voltage loading to be shared between one of the first plurality of common electrodes and one of the second plurality of common electrodes when the pixels of each row of the pixel array receive a scanning signal and a data signal; and wherein, for even-numbered video frames, the first plurality of common electrodes is configured to receive a first common voltage and the second plurality of common electrodes is configured to receive a second common voltage and wherein, for odd-numbered video frames, the first plurality of common electrodes is configured to receive the second common voltage and the second plurality of common electrodes is configured to receive the first common voltage.

2. The device of claim 1, wherein all even-numbered pixels of each row of the pixel array include a portion of a single one of the first plurality of common electrodes and wherein all odd-numbered pixels of each row of the pixel array include a portion of a single one of the second plurality of common electrodes.

3. The device of claim 1, wherein the first common voltage and the second common voltage are of opposite polarities.

4. The device of claim 1, wherein each pixel of the pixel array is configured such that no directly horizontally or directly vertically adjacent pixel includes a portion of a common electrode carrying the same polarity of common voltage.

5. A display panel comprising:

a pixel array including rows and columns of pixels, each pixel including:

a pixel electrode;

a portion of one of a plurality of common electrodes shared by a plurality of pixels of the pixel array and configured to generate an electric field in conjunction with the pixel electrode, wherein the electric field is configured to modulate light passing through the pixel; and a transistor having a gate coupled to one of a plurality of gate lines of the pixel array and a source coupled to one of a plurality of source lines of the pixel array, wherein the transistor is configured to activate the pixel electrode when a scanning signal is received on the gate line and a data signal is received on the source line;

wherein a first row of pixels of the pixel array shares a first common electrode of the plurality of common electrodes with a second row of pixels of the pixel array and shares a second common electrode of the plurality of common electrodes with a third row of pixels of the pixel array; and wherein even-numbered pixels of the first row of pixels share the first common electrode with the second row of pixels and wherein odd-numbered pixels of the first row of pixels share the second common electrode with the third row of pixels.

6. The display panel of claim 5, wherein the first row of pixels is directly adjacent to the second row of pixels or the third row of pixels.

7. The display panel of claim 6, wherein the first row of pixels is directly adjacent to both the second row of pixels and the third row of pixels.

8. The display panel of claim 5, wherein the first common electrode is shared with odd-numbered pixels of the second row and wherein the second common electrode is shared with even-numbered pixels of the third row.

9. The display panel of claim 8, wherein the first common electrode is connected between one of the even-numbered pixels of the first row of pixels and one of the odd-numbered pixels of the second row of pixels by at least one line of Indium Tin Oxide.

10. The display panel of claim 5, wherein all pixels of the first row of pixels are connected to a single gate line of the plurality of gate lines, wherein the single gate line is shared only by the pixels of the first row of pixels.

11. The display panel of claim 10, wherein the first row of pixels is configured such that, upon activation of the single gate line, common voltage loading resulting from activation is shared approximately evenly by the first common electrode and the second common electrode.

12. The display panel of claim 5, wherein the first common electrode is configured to carry a first common voltage and the second common electrode is configured to carry a second common voltage.

13. The display panel of claim 12, wherein the first common voltage and the second common voltage are of opposite polarities.

14. The display panel of claim 12, wherein the pixels of the first row of pixels are connected to the first common electrode and the second common electrode such that the pixels of the first row of pixels receive alternating polarities of common voltage.

15. A method of controlling a liquid crystal display configured to modulate light through pixels by varying electric fields arising between pixel electrodes and common electrodes, the method comprising:

supplying a first common voltage to a first plurality of common electrodes of a pixel array, wherein the pixel array comprises rows and columns of pixels, wherein each row of pixels is connected to a respective gate line and each column of pixels is connected to a respective source line, and wherein a first plurality of pixels of each row is connected to one of the first plurality of common electrodes;

supplying a second common voltage to a second plurality of common electrodes of the pixel array, wherein a second plurality of pixels of each row is connected to one of the second plurality of common electrodes;

supplying a scanning signal to a gate line corresponding respectively to one of the rows of pixels; and supplying a data signal to each source line corresponding respectively to each pixel of the one of the rows of pixels;

wherein the first common voltage is supplied to the first plurality of common electrodes, wherein the first plurality of pixels of each row is connected to one of the first plurality of common electrodes and wherein the first plurality of pixels of each row comprises every even-numbered pixel.

16. The method of claim 15, wherein supplying the first common voltage to the first plurality of common electrodes comprises supplying the first common voltage to approximately half of the common electrodes of the pixel array and wherein supplying the second common voltage to the second plurality of common electrodes comprises supplying the second common voltage to approximately half of the common electrodes of the pixel array.

17. The method of claim 15, wherein the second common voltage is supplied to the second plurality of common electrodes, wherein the second plurality of pixels of each row is connected to one of the second plurality of common electrodes and wherein the second plurality of pixels of each row comprises every odd-numbered pixel.

18. The method of claim 17, wherein the first common voltage supplied to the first plurality of common electrodes and the second common voltage supplied to the second plurality of common electrodes are of opposite polarities.

19. The method of claim 15, wherein supplying the first common voltage to the first plurality of common electrodes comprises supplying the first common voltage to even-numbered common electrodes of the pixel array, and wherein supplying the second common voltage to the second plurality of common electrodes comprises supplying the second common voltage to odd-numbered common electrodes of the pixel array.

20. A device comprising:

a processor;

a memory device operably coupled to the processor and configured to store video data; and a liquid crystal display configured to display the video data by one video frame at a time, the liquid crystal display having a pixel array including rows and columns of pixels, each pixel including:

a pixel electrode;

a portion of either one of a first plurality of common electrodes or one of a second plurality of common electrodes configured to generate an electric field in conjunction with the pixel electrode, wherein the electric field is configured to modulate light passing through the pixel; and a transistor having a gate connected to one of a plurality of gate lines of the pixel array and a source connected to one of a plurality of source lines of the pixel array, wherein the transistor is configured to provide a data signal from the source line to the pixel electrode when a scanning signal is received on the gate line;

wherein the pixels of each row of the pixel array are configured to cause an approximately even amount of common voltage loading to be shared between one of the first plurality of common electrodes and one of the second plurality of common electrodes when the pixels of each row of the pixel array receive a scanning signal and a data signal; and wherein all even-numbered pixels of each row of the pixel array include a portion of a single one of the first plurality of common electrodes and wherein all odd-numbered pixels of each row of the pixel array include a portion of a single one of the second plurality of common electrodes.

21. A device comprising:

a processor;

a memory device operably coupled to the processor and configured to store video data; and a liquid crystal display configured to display the video data by one video frame at a time, the liquid crystal display having a pixel array including rows and columns of pixels, each pixel including:

a pixel electrode;

a portion of either one of a first plurality of common electrodes or one of a second plurality of common electrodes configured to generate an electric field in conjunction with the pixel electrode, wherein the electric field is configured to modulate light passing through the pixel; and a transistor having a gate connected to one of a plurality of gate lines of the pixel array and a source connected to one of a plurality of source lines of the pixel array, wherein the transistor is configured to provide a data signal from the source line to the pixel electrode when a scanning signal is received on the gate line;

wherein the pixels of each row of the pixel array are configured to cause an approximately even amount of common voltage loading to be shared between one of the first plurality of common electrodes and one of the second plurality of common electrodes when the pixels of each row of the pixel array receive a scanning signal and a data signal; and wherein each pixel of the pixel array is configured such that no directly horizontally or directly vertically adjacent pixel includes a portion of a common electrode carrying the same polarity of common voltage.

22. A display panel comprising:

a pixel array including rows and columns of pixels, each pixel including:

a pixel electrode;

a portion of one of a plurality of common electrodes shared by a plurality of pixels of the pixel array and configured to generate an electric field in conjunction with the pixel electrode, wherein the electric field is configured to modulate light passing through the pixel; and a transistor having a gate coupled to one of a plurality of gate lines of the pixel array and a source coupled to one of a plurality of source lines of the pixel array, wherein the transistor is configured to activate the pixel electrode when a scanning signal is received on the gate line and a data signal is received on the source line;

wherein a first row of pixels of the pixel array shares a first common electrode of the plurality of common electrodes with a second row of pixels of the pixel array and shares a second common electrode of the plurality of common electrodes with a third row of pixels of the pixel array;

wherein the first common electrode is configured to carry a first common voltage and the second common electrode is configured to carry a second common voltage; and wherein the first common voltage and the second common voltage are of opposite polarities.

23. A display panel comprising:

a pixel array including rows and columns of pixels, each pixel including:

a pixel electrode;

a portion of one of a plurality of common electrodes shared by a plurality of pixels of the pixel array and configured to generate an electric field in conjunction with the pixel electrode, wherein the electric field is configured to modulate light passing through the pixel; and a transistor having a gate coupled to one of a plurality of gate lines of the pixel array and a source coupled to one of a plurality of source lines of the pixel array, wherein the transistor is configured to activate the pixel electrode when a scanning signal is received on the gate line and a data signal is received on the source line;

wherein a first row of pixels of the pixel array shares a first common electrode of the plurality of common electrodes with a second row of pixels of the pixel array and shares a second common electrode of the plurality of common electrodes with a third row of pixels of the pixel array;

wherein the first common electrode is configured to carry a first common voltage and the second common electrode is configured to carry a second common voltage; and wherein the pixels of the first row of pixels are connected to the first common electrode and the second common electrode such that the pixels of the first row of pixels receive alternating polarities of common voltage.

24. A method of controlling a liquid crystal display configured to modulate light through pixels by varying electric fields arising between pixel electrodes and common electrodes, the method comprising:

supplying a first common voltage to a first plurality of common electrodes of a pixel array, wherein the pixel array comprises rows and columns of pixels, wherein each row of pixels is connected to a respective gate line and each column of pixels is connected to a respective source line, and wherein a first plurality of pixels of each row is connected to one of the first plurality of common electrodes;

supplying a second common voltage to a second plurality of common electrodes of the pixel array, wherein a second plurality of pixels of each row is connected to one of the second plurality of common electrodes;

supplying a scanning signal to a gate line corresponding respectively to one of the rows of pixels; and supplying a data signal to each source line corresponding respectively to each pixel of the one of the rows of pixels;

wherein supplying the first common voltage to the first plurality of common electrodes comprises supplying the first common voltage to approximately half of the common electrodes of the pixel array and wherein supplying the second common voltage to the second plurality of common electrodes comprises supplying the second common voltage to approximately half of the common electrodes of the pixel array.

25. A method of controlling a liquid crystal display configured to modulate light through pixels by varying electric fields arising between pixel electrodes and common electrodes, the method comprising:

supplying a first common voltage to a first plurality of common electrodes of a pixel array, wherein the pixel array comprises rows and columns of pixels, wherein each row of pixels is connected to a respective gate line and each column of pixels is connected to a respective source line, and wherein a first plurality of pixels of each row is connected to one of the first plurality of common electrodes;

supplying a second common voltage to a second plurality of common electrodes of the pixel array, wherein a second plurality of pixels of each row is connected to one of the second plurality of common electrodes;

supplying a scanning signal to a gate line corresponding respectively to one of the rows of pixels; and supplying a data signal to each source line corresponding respectively to each pixel of the one of the rows of pixels;

wherein supplying the first common voltage to the first plurality of common electrodes comprises supplying the first common voltage to even-numbered common electrodes of the pixel array, and wherein supplying the second common voltage to the second plurality of common electrodes comprises supplying the second common voltage to odd-numbered common electrodes of the pixel array.

* * * * *